(12) United States Patent
Herath et al.

(10) Patent No.: US 10,700,912 B2
(45) Date of Patent: Jun. 30, 2020

(54) METHOD AND SYSTEM FOR NON-ORTHOGONAL MULTIPLE ACCESS COMMUNICATION

(71) Applicant: Huawei Technologies Co., Ltd., Shenzhen (CN)

(72) Inventors: Sanjeewa Herath, Ottawa (CA); Alireza Bayesteh, Ottawa (CA); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/881,408

(22) Filed: Jan. 26, 2018

(65) Prior Publication Data

US 2018/0337816 A1    Nov. 22, 2018

Related U.S. Application Data

(60) Provisional application No. 62/617,529, filed on Jan. 15, 2018, provisional application No. 62/508,876, filed on May 19, 2017.

(51) Int. Cl.
*H04L 27/36* (2006.01)
*H04L 5/00* (2006.01)
*H04W 72/04* (2009.01)

(52) U.S. Cl.
CPC .......... *H04L 27/362* (2013.01); *H04L 5/0016* (2013.01); *H04L 5/0037* (2013.01);
(Continued)

(58) Field of Classification Search
CPC ... H04L 27/363; H04L 5/0016; H04L 5/0048; H04W 72/042
(Continued)

(56) References Cited

U.S. PATENT DOCUMENTS

| 2010/0232542 A1* | 9/2010 | Miyoshi | ............... H04L 1/0041 |
| | | | 375/295 |
| 2013/0215942 A1 | 8/2013 | Kddepalli et al. | |

(Continued)

FOREIGN PATENT DOCUMENTS

| CN | 104869094 A | 8/2015 |
| CN | 105471543 A | 4/2016 |
| CN | 105791203 A | 7/2016 |

OTHER PUBLICATIONS

Huawei, Hisilicon, "Categorization and Analysis of MA Schemes," 3GPP TSG RAN WG1 Meeting #86bis, R1-1608852, Lisbon, Portugal, Oct. 10-14, 2016, 5 pages.

(Continued)

*Primary Examiner* — Chi Tang P Cheng
(74) *Attorney, Agent, or Firm* — Slater Matsil, LLP

(57) ABSTRACT

A bit-level operation may be implemented prior to modulation and resource element (RE) mapping in order to generate a NoMA transmission using standard (QAM, QPSK, BPSK, etc.) modulators. In this way, the bit-level operation is exploited to achieve the benefits of NoMA (e.g., improved spectral efficiency, reduced overhead, etc.) at significantly less signal processing and hardware implementation complexity. The bit-level operation is specifically designed to produce an output bit-stream that is longer than the input bit-stream, and that includes output bit-values that are computed as a function of the input bit-values such that when the output bit-stream is subjected to modulation (e.g., m-ary QAM, QPSK, BPSK), the resulting symbols emulate a spreading operation that would otherwise have been generated from the input bit-stream, either by a NoMA-specific modulator or by a symbol-domain spreading operation.

23 Claims, 18 Drawing Sheets

(52) U.S. Cl.
CPC ......... *H04L 5/0053* (2013.01); *H04W 72/042* (2013.01); *H04L 5/0048* (2013.01)

(58) Field of Classification Search
USPC .......................................... 370/329
See application file for complete search history.

(56) References Cited

U.S. PATENT DOCUMENTS

| | | |
|---|---|---|
| 2016/0036619 A1 | 2/2016 | Yan et al. |
| 2016/0049999 A1* | 2/2016 | Taherzadeh Boroujeni ................ H04J 13/16 370/335 |
| 2016/0316513 A1 | 10/2016 | Lee et al. |
| 2016/0373235 A1* | 12/2016 | Oh ........................... H04L 1/18 |
| 2017/0012754 A1 | 1/2017 | Sun et al. |
| 2018/0145855 A1* | 5/2018 | Chaudhuri .......... H04L 27/2602 |

OTHER PUBLICATIONS

MCC Support, "Final Report of 3GPP TSG RAN WG1 #86bis v1.0.0," 3GPP TSG RAN WG1 Meeting #87, R1-1611081, Nov. 14-18, 2016, 159 pages, Reno, USA.

Wang, Y. et al., "Analysis of Non-Orthogonal Multiple Access for 5G", China Communications, Jan. 25, 2016, KP011639760, 16 Pages, Supplement No. 2.

\* cited by examiner

| BIT DOMAIN | | SYMBOL DOMAIN | |
|---|---|---|---|
| $f(b_0, b_1, b_2, b_3) = (b_0 \text{ XNOR } b_2), b_0, (b_1 \text{ XNOR } b_3),$ $b_2, (b_0 \text{ XOR } b_2), b_0, (b_1 \text{ XOR } b_3), b_2$ | | $S1 =$ $c_0, c_1, c_2, c_3$ | $S2 =$ $c_4, c_5, c_6, c_7$ |
| INPUT $(b_0, b_1, b_2, b_3)$ | OUTPUT $(c_0, c_1, c_2, c_3, c_4, c_5, c_6, c_7)$ | | |
| 0000 | 10100000 | 1010 | 0000 |
| 0001 | 10000010 | 1000 | 0010 |
| 0010 | 00111001 | 0011 | 1001 |
| 0011 | 00011011 | 0001 | 1011 |
| 0100 | 10000010 | 1000 | 0010 |
| 0101 | 10100000 | 1010 | 0000 |
| 0110 | 00011011 | 0001 | 1011 |
| 0111 | 00111001 | 0011 | 1001 |
| 1000 | 01100100 | 0110 | 0100 |
| 1001 | 01000110 | 0100 | 0110 |
| 1010 | 11111101 | 1111 | 1101 |
| 1011 | 11011111 | 1101 | 1111 |
| 1100 | 01000110 | 0100 | 0110 |
| 1101 | 01100100 | 0110 | 0100 |
| 1110 | 11011111 | 1101 | 1111 |
| 1111 | 11111101 | 1111 | 1101 |

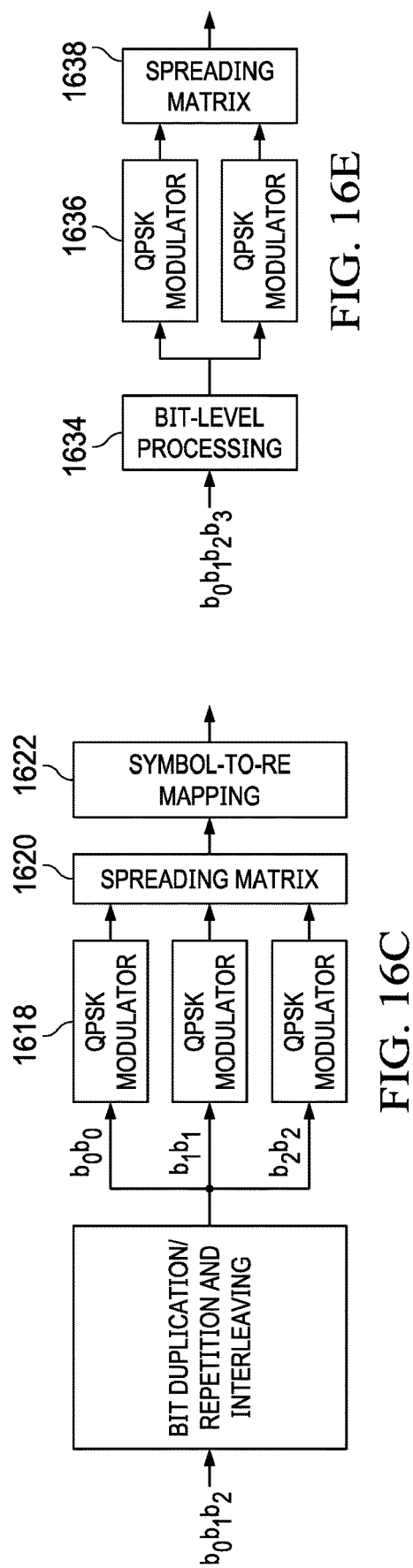
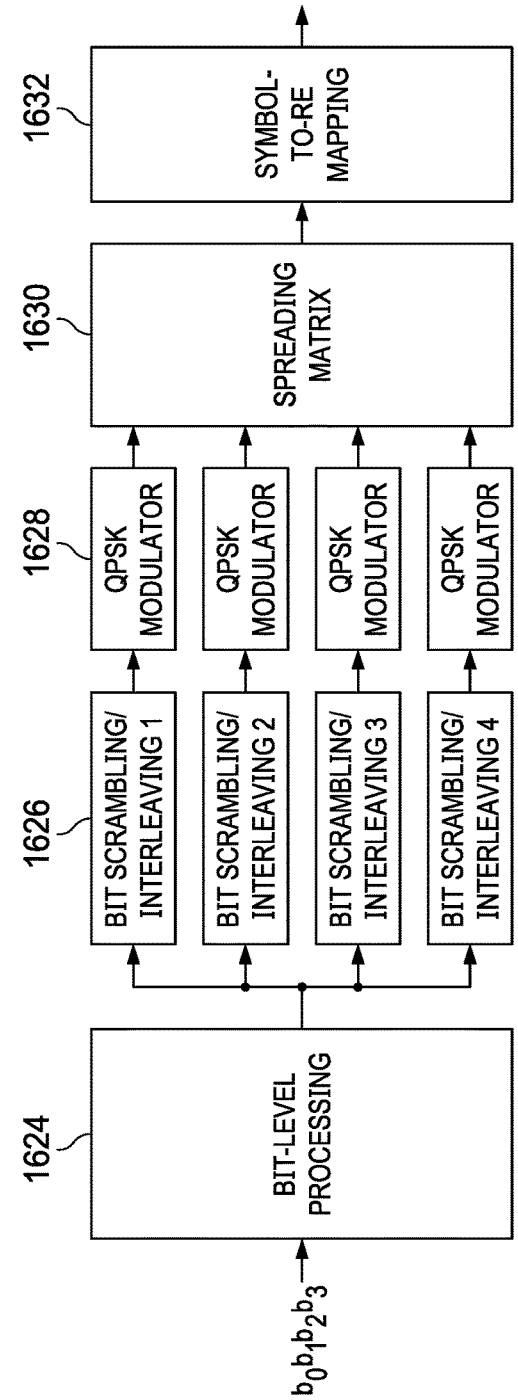

METHOD AND SYSTEM FOR NON-ORTHOGONAL MULTIPLE ACCESS COMMUNICATION

This application claims priority to U.S. Provisional Patent Application 62/508,876 filed on May 19, 2017 and entitled "Method and System for Non-Orthogonal Multiple Access Communication" and U.S. Provisional Patent Application 62/617,529 filed on Jan. 15, 2018 and entitled "Method and System for Non-Orthogonal Multiple Access Communication," both of which are incorporated herein by reference as if reproduced in their entireties.

TECHNICAL FIELD

The present disclosure relates generally to wireless communication and, in particular embodiments, to methods and systems for non-orthogonal multiple access communication.

BACKGROUND

Multiple access is a function of wireless communication systems in which multiple users can share resources. Multiple access systems may be orthogonal or non-orthogonal. In orthogonal multiple access systems, such as time division multiple access (TDMA), frequency division multiple access (FDMA), and orthogonal frequency division multiple access (OFDMA), signals for different users are transmitted on different physical channel resources (e.g., time, frequency, or some combination). In non-orthogonal multiple access (NoMA) systems, such as code division multiple access (CDMA), interleave division multiple access (IDMA), interleave grid multiple access (IGMA), multi-user shared access (MUSA), and sparse code multiple access (SCMA), there may be cross-correlation of signals for different users. Intentionally introducing non-orthogonality may increase the spectrum efficiency but may create some challenges in terms of transmitter and receiver implementation. It is desirable to design a non-orthogonal multiple access transmission mechanism that simplifies and facilitates transmitter and receiver implementation.

SUMMARY

Technical advantages are generally achieved, by embodiments of this disclosure which describe methods and systems for non-orthogonal multiple access communication.

In accordance with an embodiment, a method for using a bit-level operation to enable non-orthogonal multiple access (NoMA) communication using a standard modulator is provided. In this embodiment, the method includes generating an output bit-stream from an input bit-stream in accordance with a bit-level operation on the input bit-stream such that a length of the output bit-stream is greater than a length of the input bit-stream. The input bit-stream is an error-detection/correction encoded bit-stream. The method further includes modulating the output bit-stream in accordance with the standard modulator to obtain a sequence of symbols. A value of at least one bit of the input bit-stream is associated with at least two symbols of the sequence of symbols. The standard modulator is one of Quadrature Amplitude Modulation (QAM) modulator, a Binary Phase Shift Keying (BPSK) modulator, a $$\frac{\pi}{2} - BPSK$$

modulator, and a Quadrature Phase Shift Keying (QPSK) modulator. The method further includes mapping the sequence of symbols to resource elements to obtain a NoMA signal, and transmitting the NoMA signal to a receiver. In one example, the sequence of symbols includes a plurality of different subsets of symbols, where at least two subsets of symbols are associated with different bits in the input bit-stream. In the same example, or in another example, the sequence of symbols includes a plurality of different subsets of symbols, and a relationship between symbols in a subset of the plurality depends on a value of a bit associated with the subset. In any one of the preceding examples, or in another example, a relationship between symbols in the sequence of symbols is independent of a value of the input bit-stream. In any one of the preceding examples, or in another example, the method further includes encoding information bits to generate the error-detection/correction coded input bit-stream by a forward error correction (FEC) encoder. In any one of the preceding examples, or in another example, transmitting the NoMA signal with a UE comprises transmitting the NoMA signal from a base station to the UE, or transmitting the NoMA signal from a UE to the base station. In any one of the preceding examples, or in another example, different NoMA signals are transmitted to or by the same UE. In such an example, the respective NoMA signals may be transmitted using different NoMA signatures, with each of the different NoMA signatures being assigned to the same UE. In any one of the preceding examples, or in another example, different NoMA signals are transmitted to or by different UEs. In any one of the preceding examples, or in another example, the method further includes transmitting an indication of a multiple access (MA) signature to the UE, where the MA signature configures the UE to use a specific bit-level operation to distinguish the UE's uplink transmission from other UEs' uplink transmissions. In any one of the preceding examples, or in another example, the method further includes transmitting an indication of a multiple access (MA) signature to the UE, where the MA signature configures the UE to use a specific bit-level operation to decode a downlink NoMA transmission. An apparatus and computer program product for performing this method is also provided.

BRIEF DESCRIPTION OF THE DRAWINGS

For a more complete understanding of the present disclosure, and the advantages thereof, reference is now made to the following description taken in conjunction with the accompanying drawings, in which:

FIG. 16C is a diagram of a transmitter configured to generate data symbols for transmission on a communication channel, according to other embodiments;

FIG. 16D is a diagram of a transmitter configured to generate data symbols for transmission on a communication channel, according to other embodiments;

FIG. 16E is a diagram of a transmitter configured to generate data symbols for transmission on a communication channel, according to other embodiments;

DETAILED DESCRIPTION OF ILLUSTRATIVE EMBODIMENTS

Figure 1:
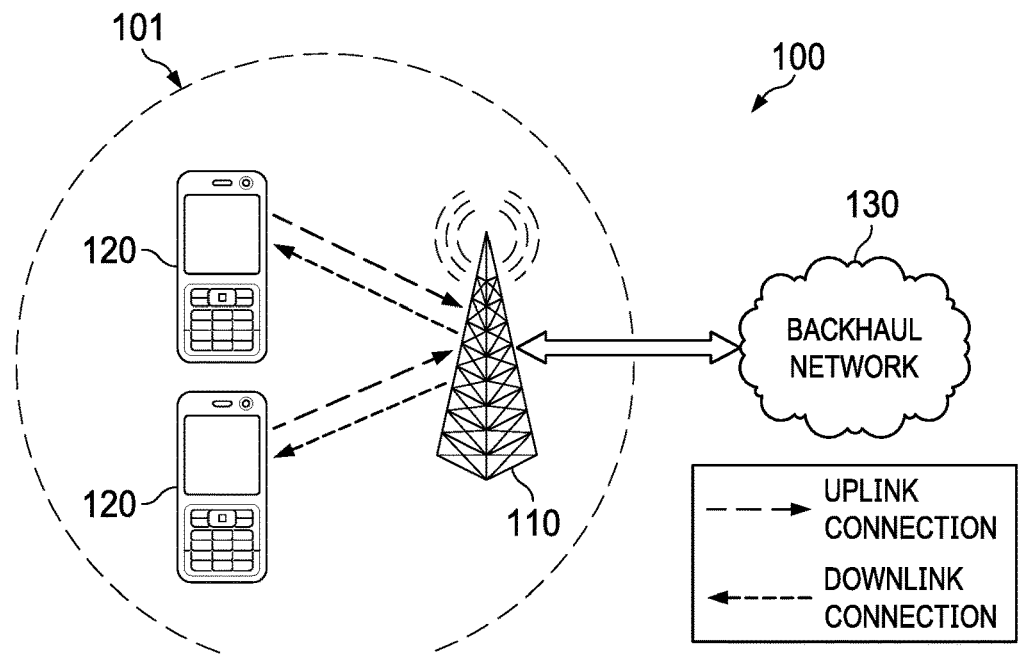
FIG. 1 is a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Conventional non-orthogonal multiple access (NoMA) transmitters generally require inclusion of one or more NoMA-specific operations in the transmission chain. These NoMA-specific operations may involve modification of existing modules and operations in a conventional orthogonal multiple access transmitter, or may involve the addition of further modules and operations on top of the existing modules and operations in the conventional orthogonal multiple access transmitter. NoMA-specific operations may apply an MA signature to a signal prior to transmission in order to facilitate multi-stream detection. As used herein, the term "MA signature" refers to a transmitter operation that generates a NoMA signal for a particular layer/stream based on one or more stream-specific features, which allows the NoMA signal to be multiplexed with other NoMA signals that are transmitted over the same set of resource elements such that the respective NoMA signals may be decoded using multi-stream detection techniques at the corresponding receiver(s). It should be appreciated that MA signatures may take different forms depending upon the multiple access scheme that is being implemented. For example, if linear spreading is used, then the MA signatures may correspond to the spreading sequence. As another example, MA signatures may correspond to interleaving pattern (in bit or symbol domain) or symbol to resource mapping pattern.

Complex NoMA schemes may be implemented using a non-standard, NoMA-specific modulator, which directly converts a bit-stream into data symbols having the desired properties of the particular NoMA scheme. However, the hardware implementation of a non-standard, NoMA-specific modulator is significantly more complex than a conventional hardware implementation using standardized modulators such as Quadrature Amplitude Modulation (QAM), Binary Phase Shift Keying (BPSK), $$\frac{\pi}{2} - BPSK$$

modulator, and Quadrature Phase Shift Keying (QPSK, also known as 4-QAM). Therefore, due to this increased complexity and expense, NoMA-specific modulators may be unsuitable for many practical applications. As a result, wireless telecommunication standards that have historically mandated the use of standard modulators (e.g., BPSK modulator, $$\frac{\pi}{2} - BPSK,$$

QPSK, 16-QAM, 64-QAM, 256-QAM, etc.) have been reluctant to adopt advanced NoMA implementations, despite their considerable theoretical performance benefits. Advantages of NoMA include improved spectral efficiency and reduced overhead, which are achieved in so far as NoMA generally provides increased multiplexing layers and multiplexed connection density, as well as flexible resource allocation/utilization and interference mitigation through a reducing in collisions.

For another example, some NoMA schemes are conventionally implemented using additional symbol-domain operations on top of common operations in the transmitter. In other words, even if the NoMA scheme is implemented using a standard modulator, some conventional NoMA schemes require additional processing of the symbols generated by the standard modulator. In many cases, these additional symbol-domain operations are complex or proprietary and may not be hardware implementation-friendly.

Accordingly, embodiments of the present disclosure describe hardware-friendly examples of advanced NoMA implementations, which may be easily and readily utilized in next-generation standards to take advantage of the performance benefits of said NoMA implementations with little or no undesirable impact on hardware complexity. Embodiments of the present disclosure describe techniques that may be used for implementing NoMA transmission capabilities using standard modulators (e.g., m-ary QAM, QPSK, BPSK, or $$\frac{\pi}{2} - BPSK).$$

Furthermore, embodiments of the present disclosure also describe techniques that may be used for implementing NoMA transmission capabilities without complex or proprietary symbol-domain operations.

According to embodiments of the present disclosure, advanced NoMA schemes include NoMA schemes that employ an operation known as "spreading." In the present disclosure, spreading is defined to encompass operations that associate a value of one input bit in the transmission chain, with two or more symbols generated in the transmission chain. That is, the value of the one input bit becomes associated with two or more symbols transmitted over physical resources. Spreading may also be known as multi-dimensional modulation or a multi-dimensional operation, where multiple instances (dimensions) of the different tones or symbols represent the spreading effect.

Spreading may also include informal sub-classifications, such as linear spreading and non-linear spreading, which may be viewed as distinct subsets or overlapping subsets of operations, depending on how these operations are defined. As used herein, the term "linear spreading" refers to a transmitter operation that creates a relationship between symbols in a sequence of symbols that is independent of input bit values of the input bit-stream such that a change in the input values does not affect the relationship between the symbols. By way of example, an embodiment linear spreading technique may effectuate a phase difference between two symbols that remains consistent across all combinations of input bit-values. The term "non-linear spreading" refers to a transmitter operation that creates a relationship between symbols in a sequence of symbols that depends on input bit values of the input bit stream such that different relationships between symbols are formed for different combinations of input bit-values.

Conventionally, both of these linear and non-linear spreading operations are implemented in the symbol-domain, either using a non-standard, NoMA-specific modulator, or using additional NoMA-specific symbol-domain operations. In an aspect, the present disclosure aims to implement these linear and non-linear spreading operations in the bit-domain, not in the symbol-domain, and without the use of a non-standard, NoMA-specific modulator.

While certain aspects of the present disclosure are particularly applicable to NoMA schemes that employ spreading, some aspects the present disclosure also provide benefits to other NoMA schemes in general and, therefore, are not limited to any specific spreading schemes. Specifically, aspects of the present disclosure also describe bit-domain implementations of generalized MA signature generation, which includes other operations such as scrambling and interleaving, in addition to spreading.

Aspects of this disclosure utilize a bit-level operation prior to modulation and resource element (RE) mapping in order to generate a NoMA transmission using standard (QAM, QPSK, BPSK, $$\frac{\pi}{2} - BPSK,$$

etc.) modulators. In this way, the bit-level operation is exploited to achieve the benefits of NoMA (e.g., improved spectral efficiency, reduced overhead, etc.) at significantly less signal processing and hardware implementation complexity. The bit-level operation is specifically designed to produce an output bit-stream that is longer than the input bit-stream, and that includes output bit-values that are computed as a function of the input bit-values such that when the output bit-stream is subjected to modulation (e.g., m-ary QAM, QPSK, $$\frac{\pi}{2} - BPSK),$$

the resulting symbols emulate a spreading operation that would otherwise have been generated from the input bit-stream, either by a NoMA-specific modulator or by a symbol-domain spreading operation.

The output bit-stream is then separated into two or more subsets of output bits, which are modulated using one or more standard modulators to generate a sequence of two or more symbols, which together form/emulate a symbol sequence having spreading. In one embodiment, the subsets of output bits are modulated in parallel using two or more QAM modulators. In other embodiments, the subsets of output bits are modulated in sequence using the same QAM modulator. The sequence of symbols may then be mapped, or otherwise spread across, a set of resource elements (REs) to produce a NoMA signal, which can be transmitted to a corresponding receiver, e.g., a user equipment (UE), base station, etc. Using bit-level operations, in conjunction with QAM modulation and RE-to-symbol mapping, to generate NoMA signals reduces the complexity of NoMA signal generation because bit-level operations are easier to implement than symbol-level operations. Additionally, using bit-level operations, rather than NoMA-specific modulation, provides greater flexibility in terms of diversified NoMA signal generation because bit level processing can be implemented/updated in software with little or no modifications in hardware. All of this reduced complexity also serves to reduce the cost of designing and manufacturing NoMA capable transceiver chips. Although many embodiments are described as implementing bit-level operations with standard NoMA modulators, it should be appreciated that the bit-level operations provided herein may also be implemented with non-standard NoMA modulators. These and other aspects are described in greater detail below.

FIG. 1 is diagram of a network 100 for communicating data. The network 100 comprises a base station no having a coverage area 101, a plurality of user equipments (UEs) 120, and a backhaul network 130. As shown, the base station no establishes uplink (dashed line) and/or downlink (dotted line) connections with the UEs 120, which serve to carry data from the UEs 120 to the base station no and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as an enhanced Node B (eNB), a transmit/receive point (TRP), a macro-cell, a femtocell, a Wi-Fi access point (AP), and other wirelessly enabled devices. Base stations may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

In conventional orthogonal multiple access schemes, the data carried on the uplink connections and the downlink connections 150, of the different mobile devices, use different physical resource elements (e.g., time, frequency, code, etc.). While relatively simple and implementation-efficient, orthogonal multiple access schemes suffer from relatively poorer spectrum efficiency. Implementation-friendly non-orthogonal multiple access methods are desired to improve the spectrum efficiency of wireless communication systems.

Figure 2:
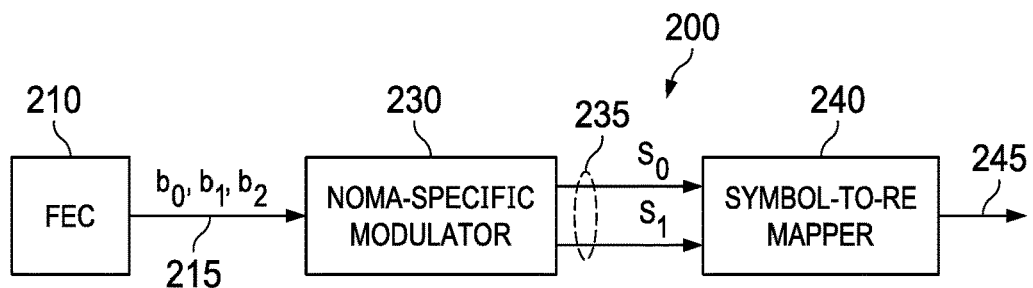
FIG. 2 is a diagram of a conventional NoMA transmitter that relies on a NoMA-specific modulator to generate a sequence of symbols.

FIG. 2 is a diagram of a conventional transmitter 200 that uses NoMA-specific modulation techniques to generate a NoMA signal. As shown, the conventional transmitter 200 includes a forward error correction (FEC) encoder 210, a NoMA modulator 230, and a symbol-to-RE mapper 240. The FEC encoder 210 generates a bit-stream 215, which is forwarded to the NoMA modulator 230. The NoMA modulator 230 may be a sparse code multiple access (SCMA) modulator, MUSA or any other type of modulator that is configured to generate a sequence of symbols 235 based on the bit-stream 215 such that at least one bit (e.g., b2, etc.) of the bit-stream 215 is associated with both symbols $S_1$ and $S_2$ of the sequence of symbols 235. The terms "sequence of symbols" and "set of symbols" are used interchangeably herein to refer to symbols that are generated in parallel or sequentially by one or more modulators. The sequence of symbols 235 is then transmitted to the symbol-to-RE mapper 240, which spreads the symbols of the sequence of symbols 235 across a set of resource elements to generate a NoMA signal 245.

As discussed above, NoMA-specific modulators are relatively complex, and as a result, may be unsuitable for some applications. Embodiments of this disclosure introduce a bit-level operation prior to BPSK, $$\frac{\pi}{2} - BPSK,$$

QPSK, and/or QAM modulation in order to generate a sequence of symbols using standard QAM modulators.

Figure 3:
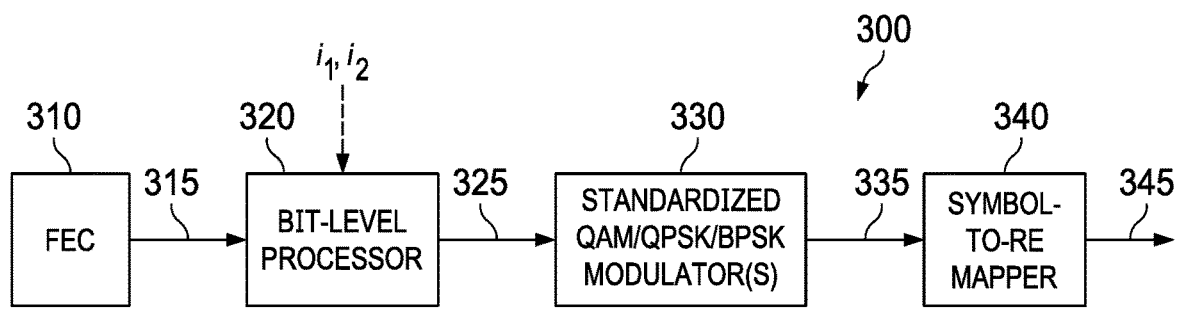
FIG. 3 is a diagram of an embodiment NoMA transmitter that uses a bit-level operation and QAM modulator to generate a NoMA signal.

FIG. 3 is a diagram of an embodiment transmitter 300 that uses a bit-level operation 320 in conjunction with BPSK, $$\frac{\pi}{2} - BPSK,$$

QPSK, and/or QAM modulators 330, 331 to generate a NoMA signal 345. As shown, the embodiment transmitter 300 includes an FEC encoder 310, a bit-level processor 320, BPSK, $$\frac{\pi}{2} - BPSK,$$

QPSK, and/or QAM modulator 330, and a symbol-to-RE mapper 340. The FEC encoder 310 may be any encoder configured to produce an error-detection/correction encoded bit stream, including (but not limited to) a Turbo encoder, a low-density parity-check (LDPC) encoder, and/or a polar encoder. An error detection/correction encoded bit stream may be a bit-stream that includes error correction bits (e.g., parity bits, FEC bits, etc.) and/or error detection bits (e.g., cyclic redundancy check (CRC) bits, etc.). The FEC encoder 310 generates an input bit-stream 315, and forwards the input bit-stream 315 to the bit-level processor 320. The bit-level processor 320 performs a bit-level operation on the input bit-stream 315 to generate an output bit-stream 325 that is longer than the input bit-stream. The bit-level operation may be defined by parameters $i_1$, $i_2$, which are discussed in greater detail below. The bit-level operation utilize a multiple access (MA) signature in order to enable multi-stream detection at the receiver. In this way, the bit-level operation emulates the symbol-domain operations of a NoMA-specific modulator, and is therefore different than conventional bit-level operations, such as error-correction, error-detection, and rate-matching bit-level operations, which serve to provide error-detection, error-correction, or coding gain manipulation in the bit-domain. The output bit-stream 325 is then forwarded to the BPSK, $$\frac{\pi}{2} - BPSK,$$

QPSK, and/or QAM modulator(s) 330, where different sub-sets of bits from the output bit-stream 325 are modulated separately to create a corresponding symbol in a sequence of symbols that collectively form a sequence of symbols 335.

The BPSK, $$\frac{\pi}{2} - BPSK,$$

QPSK, and/or QAM modulator(s) 330 may include a single QAM modulator that modulates the respective sub-sets of bits in a consecutive manner to generate each of the corresponding symbols of the sequence of symbols 335. Alternatively, the $$\frac{\pi}{2} - BPSK,$$

QPSK, and/or QAM modulator(s) 330 may include two or more BPSK, $$\frac{\pi}{2} - BPSK,$$

BPSK, QPSK, and/or QAM modulators that modulates the respective sub-sets of bits in a parallel manner to generate the symbols of the sequence of symbols 335. The QAM modulator(s) 330 may include any BPSK, $$\frac{\pi}{2} - BPSK,$$

QPSK, and/or m-ary QAM modulator, e.g., a 4-QAM, 8-QAM, 16-QAM, 64-QAM, 256-QAM. The sequence of symbols 335 is then forwarded to the symbol-to-RE mapper 340, which maps the corresponding sequence of symbols to a set of REs in order to obtain a NoMA signal 345. The NoMA signal 345 is then transmitted to a receiver.

Figure 4:
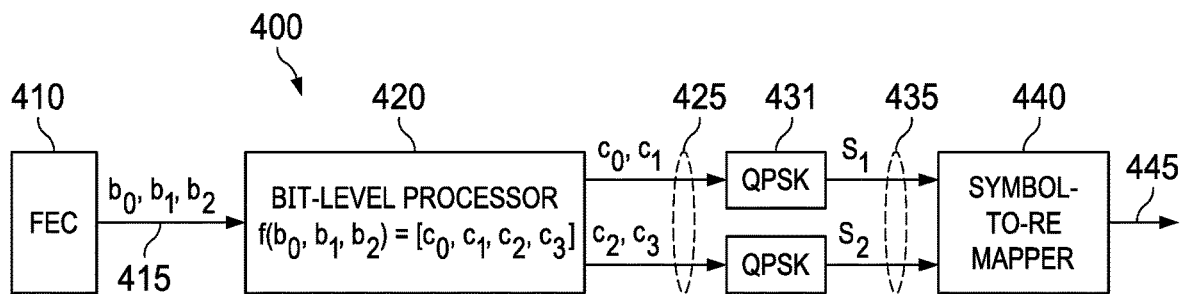
FIG. 4 is a diagram of another embodiment NoMA transmitter that uses a bit-level operation and QPSK modulators to generate a NoMA signal.

FIG. 4 is a diagram of an embodiment transmitter 400 that uses a bit-level operation 420 in conjunction with parallel QPSK modulators 431, 432 to generate a NoMA signal 445. As shown, the embodiment transmitter 400 includes an FEC encoder 410, a bit-level processor 420, QPSK modulators 431, 432, and a symbol-to-RE mapper 440. The FEC encoder 410 and symbol-to-RE mapper 440 may be configured similarly to the FEC encoder 310 and symbol-to-RE mapper 340 in FIG. 3. In this example, the FEC encoder 410 generates an input bit-stream 415 that includes three bits ($b_0$, $b_1$, $b_2$), and forwards the input bit-stream 415 to the bit-level processor 420, which performs a bit-level operation on the input bit-stream 415 to generate an output bit-stream 425 that includes four bits ($c_0$, $c_1$, $c_2$, $c_3$). The output bit-stream 425 is then split into two subsets of bits, namely ($c_0$, $c_1$) and ($c_2$, $c_3$), which are modulated in parallel by the QPSK modulators 431, 432 to generate two symbols, namely $S_1$ and $S_2$ (respectively), that collectively form a sequence of symbols 435. It should be appreciated that, in other examples, the subsets of bits ($c_0$, $c_1$), ($c_2$, $c_3$) may be modulated serially by a single QPSK modulator. The symbols $S_1$, $S_2$ are then mapped to a set of REs by the symbol-to-RE mapper 440 to obtain a NoMA signal 445, which is transmitted to a receiver, e.g., a UE or base station/NodeB.

Figure 5A:
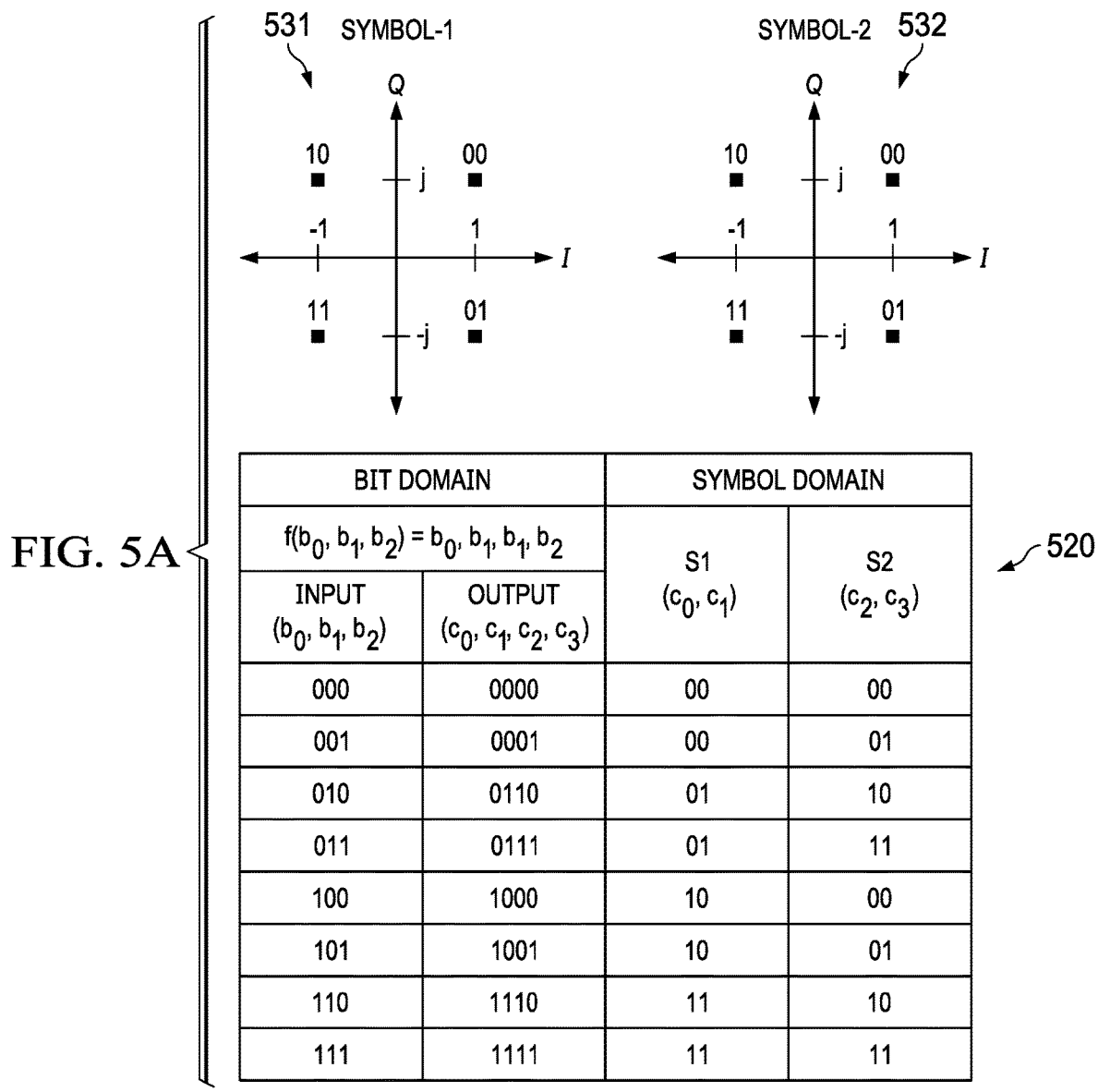
FIGS. 5A-5B are diagrams of look-up tables corresponding to example bit-level operations and example constellation diagrams corresponding to QPSK modulators used to generate the sequence of symbols in FIG. 4.
Figure 5B:
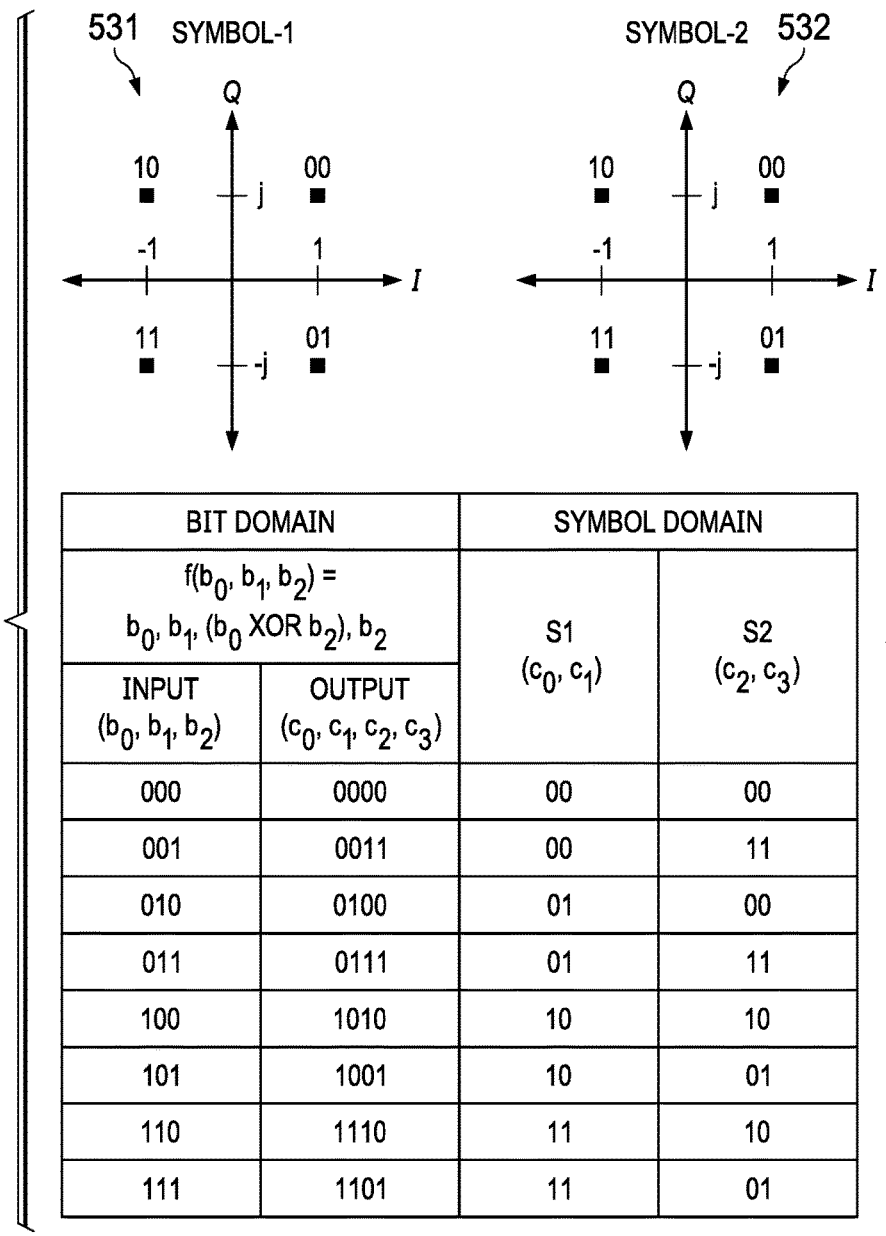

FIGS. 5A and 5B depict look-up tables 520, 570 and constellation diagrams 531, 532 for generating the sequence of symbols 435 in FIG. 4. The look-up tables 520, 570 correspond to different bit-level operations for converting the input bit-stream 415 to the output bit-stream 425 at the bit-level processor 420, and associate different bit-values of the input bit-stream 415 with resulting bit-values of the output bit-stream 425 as would result from execution of the corresponding bit-level operations, as well as identify the corresponding values of the symbols $S_1$, $S_2$ that would be obtained from modulating the resulting output bit-values at the QPSK modulators 431, 432 according to the constellation diagrams 531, 532. In particular, the look-up table 520 corresponds bit-level operation: $c=f(b_0, b_1, b_2)=[b_0, b_1, b_1, b_2]=[c_0, c_1, c_2, c_3]$, and the look-up table 570 corresponds bit-level operation: $c=f(b_0, b_1, b_2)=[b_0, b_1, (b_0 \text{ XOR } b_2), b_2]=[c_0, c_1, c_2, c_3]$, where c is the output bit-stream, $b_0$, $b_1$, and $b_2$ are input bit-values of the input bit-stream, XOR is an exclusive OR (XOR) gate, and $c_0$, $c_1$, $c_2$, and $c_3$ are output bit-values of the output bit-stream c. The bit-level operation corresponding to the look-up table 520 can be expressed in matrix form as follows:

$$\underline{c} = \begin{bmatrix} c_0 \\ c_1 \\ c_2 \\ c_3 \end{bmatrix} = \left( \begin{bmatrix} 1 & 0 & 0 \\ 0 & 1 & 0 \\ 0 & 1 & 0 \\ 0 & 0 & 1 \end{bmatrix} \begin{bmatrix} b_0 \\ b_1 \\ b_2 \end{bmatrix} \right) \bmod 2 = \begin{bmatrix} b_0 \\ b_1 \\ b_1 \\ b_2 \end{bmatrix}.$$

The bit-level operation corresponding to the look-up table 570 can be expressed in matrix form as follows:

$$\underline{c} = \begin{bmatrix} c_0 \\ c_1 \\ c_2 \\ c_3 \end{bmatrix} = \left( \begin{bmatrix} 1 & 0 & 0 \\ 0 & 1 & 0 \\ 1 & 0 & 1 \\ 0 & 0 & 1 \end{bmatrix} \begin{bmatrix} b_0 \\ b_1 \\ b_2 \end{bmatrix} \right) \bmod 2.$$

It should be appreciated that the bit-level operations reflected by the look-up tables 520, 570 are two of many possible bit-level operations that can be used in conjunction with QPSK modulators 431, 432 to convert the input bit-stream 415 into the output bit-stream 425.

After using the bit-level operations to process the input bit-stream 415, the resulting output bit-stream 425 may then be broken into two sub-sets of bits, namely [$c_0$, $c_1$] and [$c_2$, $c_3$], which are QPSK modulated based on the constellation diagrams 531, 532 to produce respective symbols in a pair of symbols: $S_1=[c_0, c_1]$ and $S_2=[c_2, c_3]$. It should also be appreciated that the constellation diagrams 531, 532 are provided as examples, and that different constellation diagram configurations may be used to modulate the output bit-stream 425 into the sequence of symbols S1, S2.

When the bit-level operation corresponding to the look-up table 520 is used, the input bit value $b_1$ of the input bit-stream 415 is associated with both symbols $S_1$, $S_2$. When the bit-level operation corresponding to the look-up table 570 is used, the input bit value $b_0$ of the input bit-stream 415 is associated with both symbols $S_1$, $S_2$. From this, it can be appreciated that, by virtue of the bit-level operations, the values of both symbols $S_1$ and $S_2$ depend, at least partially, on the same input-bit, which creates a relationship between symbol $S_1$ and symbol $S_2$ that is associated with a component of an MA signature, and that can be exploited by the receiver to mitigate multi-user interference between the instant NoMA signal and other NoMA signals transmitted over the same REs. In particular, the receiver may process symbols $S_1$ and $S_2$ in an iterative fashion using, for example, a message passing algorithm (MPA) to generate log likelihood ratios (LLRs) for each the input-bits $b_0$, $b_1$, and $b_2$. The LLRs of three input-bits can then be sent to an FEC decoder for bit-level decoding, in which the LLRs are further processed until a hard-decision is made for each input bit $b_0$, $b_1$, and $b_2$. It should be noted that, in this example, the relation between symbols $S_1$ and $S_2$ is dependent on the value of the input bit $b_1$ such that changing the value of $b_1$ will impact the relationship between $S_1$ and $S_2$. This input bit-dependent relationship between symbols of a NoMA signal is beneficial in so far as it provides an additional degree of freedom to multi-user detection.

Figure 6:
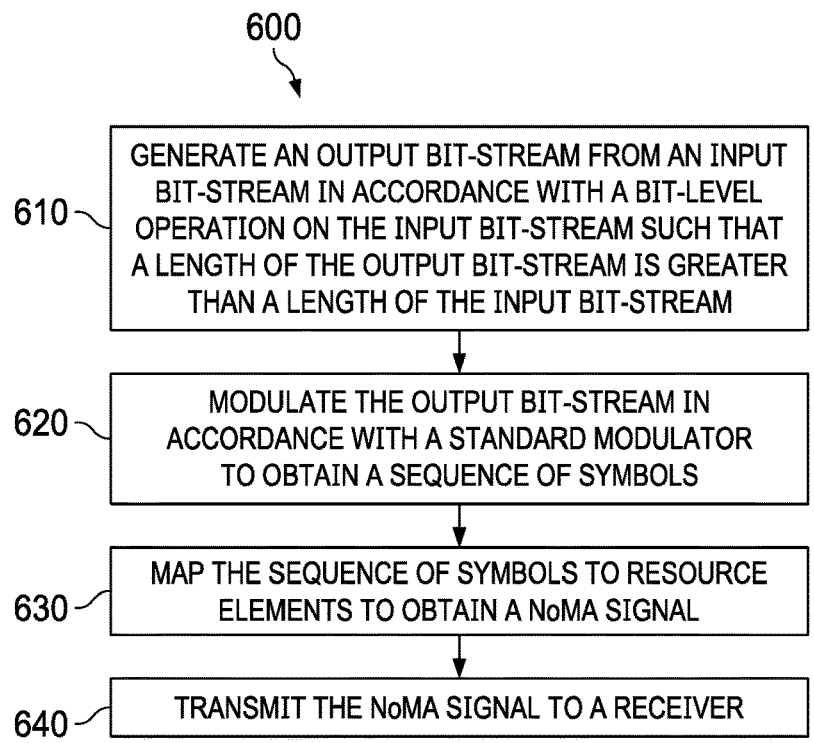
FIG. 6 is a flowchart of an embodiment method for using a bit-level operation to generate a NoMA signal.

FIG. 6 is a flowchart of an embodiment method 600 for using a bit-level operation and QAM modulators to generate a NoMA signal, as may be performed by a transmitter. At step 610, the transmitter generates an output bit-stream from an input bit-stream in accordance with a bit-level operation on the input bit-stream such that a length of the output bit-stream is greater than a length of the input bit-stream. The input bit-stream is an error-correction encoded bit-stream that includes error detection bits, such as cyclic redundancy check (CRC) bits. In some embodiments, the length of the output bit-stream may be the same as the length of the input bit-stream, such as when the bit-level operation primarily emulates symbol-domain scrambling. At step 620, the transmitter modulates the output bit-stream in accordance with the m-ary QAM modulator to obtain a sequence of symbols. A value of at least one bit of the input bit-stream is associated with at least two symbols in the sequence of symbols. At step 630, the transmitter maps the sequence of symbols to resource elements to obtain a NoMA signal. At step 640, the transmitter transmits the NoMA signal to a receiver, e.g., a UE, base-station/NodeB.

Embodiments of this disclosure provide methods for generating NoMA signals using a bit level operation in conjunction with m-ary QAM modulator(s). The resulting output bit-stream may be a function of the input bit-stream, and different sub-sets of bit in the output bit-stream may be modulated separately using m-ary QAM modulator(s) to produce a sequence of symbols, which may then be mapped to resource elements (REs) via a symbol-to-RE mapper in order to generate a NoMA signal.

Embodiment bit-level operations may utilize a multiple access (MA) signature to process the input bit-stream in order to emulate symbol domain operations of a NoMA modulator. In this way, the embodiment bit-level operations differ from conventional bit-level operations, such as FEC, CRC, and rate matching bit-level operations which provide error-correction, error detection and rate matching in the bit-domain, but do not serve to enable multi-user detection in the symbol domain.

Conventionally, the relationship of the symbols in a NoMA signal is typically achieved by symbol domain operations that are performed after the bit-stream is modulated into symbols. These symbol domain operations create relationship between symbols in the resulting sequence of symbols corresponding to the underlying MA signatures, and which allow receivers to detect which multiple access layer carries their NoMA signal, as well as serves to mitigate multi-user/inter-stream interference between the corresponding NoMA signal and other NoMA signals transmitted over the same resources.

Figure 7:
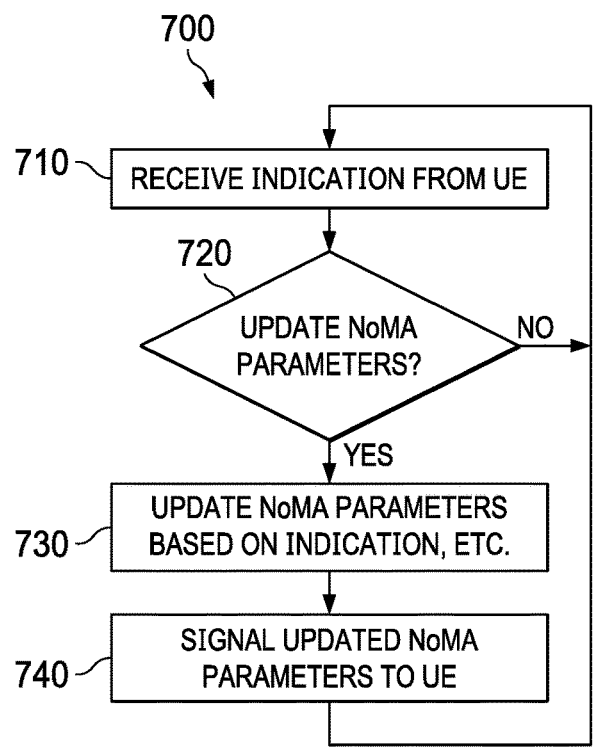
FIG. 7 is a flowchart of an embodiment method for selecting NoMA parameters.

FIG. 7 is a flowchart of an embodiment method 700 for selecting NoMA parameters, as might be performed by a base station. At step 710, the base station receives an indication from at least one UE. The indication may include any information that may facilitate selection of the NoMA parameters by the base station, including peak to average power ratio (PAPR) requirements, application type, transmission type/mode, transport block size (TBS), spectral efficiency (SE), modulation and coding scheme (MCS), UE capability, and key performance indicator (KPI). The UE may indicate or report the parameters to the network explicitly implicitly, for example, by making the selection linked to UE identifier using a pre-configured mapping. Other explicit or implicit signaling possibilities also exist for communicating the parameters from the UE to the network, or vice versa. At step 720, the base station determines whether to update the NoMA parameters based on the indication. If so, then the base station updates the NoMA parameters at step 730, and signals the updated NoMA parameters to the UE at step 740, after which the method 700 reverts back to step 710. Otherwise, if the base station decides not to update the NoMA parameters during step 720, then the method 700 reverts back to step 710 without steps 730 and 740 being performed.

During step 730, the base station may update the NoMA parameters based on the indication received during step 710, indications received from others UEs being served by the base station, indications received from UEs being served by neighboring base stations, measurements taken by the base station (e.g., measurements derived from uplink pilots, reference signals, data, etc.), information received from other neighboring base stations (e.g., measurements, scheduling information, NoMA parameters assigned/used by neighboring base stations, etc.), and/or downlink information transmitted to the UEs. The NoMA parameters may include MA signatures (e.g., $i_1$, $i_2$, etc.), NoMA signal generation constraints (e.g., scrambling/spreading bit-level operations parameters), as well as NoMA related measurements that are to be taken and fed back to the base station. The NoMA parameters may be communicated via Radio Resource Control (RRC) signaling, downlink control information (DCI) messages, and/or media access control (MAC) control element (MAC-CE) signaling. Although the NoMA parameters are selected by the base station in the example corresponding to the embodiment method 700, it should be appreciated that the NoMA parameters may be selected by the UE in other examples. For instance, a UE may select NoMA parameters based on indications from network. In some examples, some NoMA parameters are selected by the UE, while other NoMA parameters are selected by the base station. In some other embodiments, UE identifier (UE id) can be used for NoMA parameters selection by UE. It should be appreciated that the NoMA parameters selected by the base station and/or the UE may be used to transmit uplink and/or downlink NoMA signals. When the NoMA parameters are used for uplink transmissions, the base station may send a signal that specifies NoMA parameters selected by the base station and/or information to be used for selection of NoMA parameters by the UE, and the UE may use said the indicated NoMA parameters to transmit uplink NoMA signals. When the NoMA parameters are used for downlink transmissions, the base station may send a signal that specifies NoMA parameters selected by the base station and/or information to be used for identification of NoMA parameters by the UE, and the UE may use said the indicated NoMA parameters for decoding of one or more downlink NoMA signals using a multi-stream detection techniques.

Figure 8:
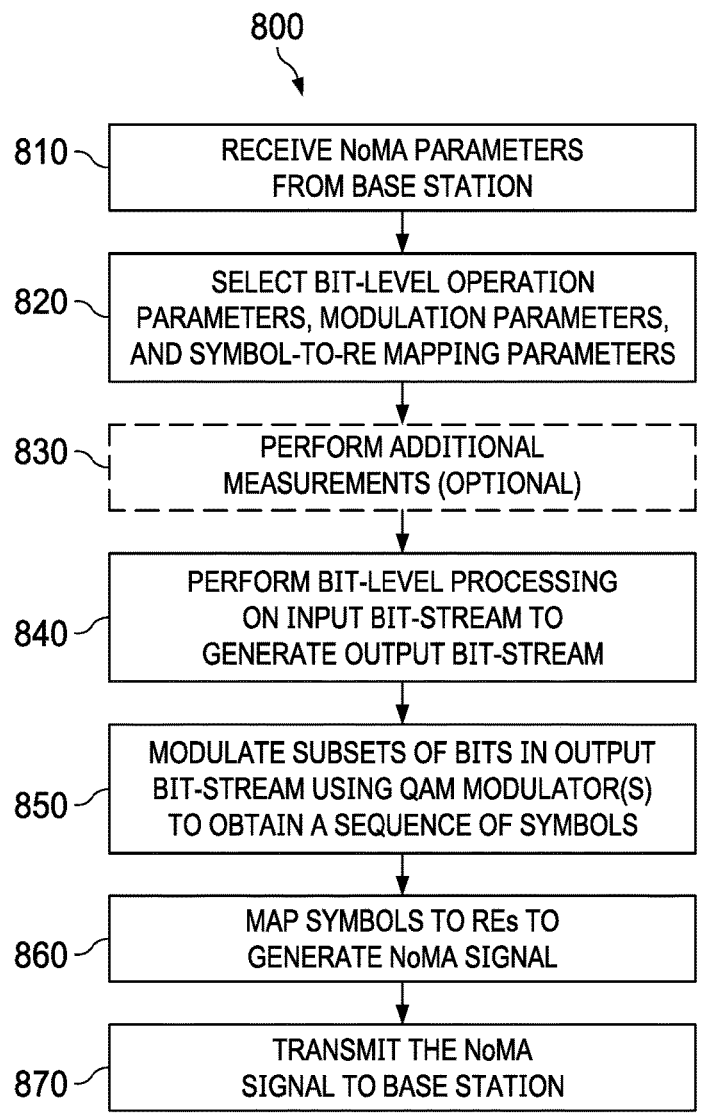
FIG. 8 is a flowchart of an embodiment method for transmitting a NoMA signal.

FIG. 8 is a flowchart of an embodiment method 800 for transmitting a NoMA signal, as might be performed by a UE. At step 810, the UE receives NoMA parameters from a base station. The NoMA parameters could include any parameter used to generate or transmit a NoMA signal, including a MA signature, bit-level operation parameters, QAM modulation parameters, symbol-to-RE mapping parameters, resources over which to transmit the NoMA signal, transmit power levels, MCS parameters, receiver capability, traffic load, PAPR requirement, transmission type/mode, application type, TBS, KPI requirement, etc. At step 820, the UE selects bit-level operation parameters, modulation parameters, and/or symbol-to-RE mapping parameters based on, for example, the NoMA parameters received from the base station, measurements taken by the UE, and/or a priori information. In some embodiments, the UE may take additional measurements at step 830. Such measurements may be instructed by the base station, or otherwise may be associated with a selection made during step 820. At step 840, the UE performs bit-level processing on an input bit-stream to generate an output bit-stream. At step 850, the UE modulates subsets of bits in the output bit-stream using QAM modulator(s) to obtain a sequence of symbols. At step 860, the UE maps symbols in the sequence of symbols to REs in order to generate a NoMA signal. At step 870, the UE transmits the NoMA signal to the base station. Although the method 800 is described in the context of uplink NoMA transmissions, it should be appreciated that the signaling communicated thereby may also be used to select and/or identify NoMA parameters for receiving downlink NoMA signals by the UE.

In some cases, UE may derive NoMA parameters from other information received from the base station, such as information indicating an MCS level, TBS, spreading factor or related parameter, sparsity level/factor which may be defined as the ratio of non-zero resources utilized for data transmission for a given device over the total available resources, or related parameter, Hybrid Automatic-Repeat-Request (HARQ) and associated parameters, grant-free or grant-based transmission and associated parameters, a number of UEs being served by the base station or related parameters such as the traffic load which refers to the average number of users/streams simultaneously served by the base station (which is also referred to overloading factor). A UE may also select NoMA parameters based on a UE specific identifier, e.g., a radio node temporary identifier (RNTI). A UE may also select NoMA parameters based on an index associated with a demodulation reference signal (DM-RS) pattern. A UE may also randomly select NoMA parameters, e.g., a. NoMA signal is selected randomly based on information carrying bits, and the base station detects the NoMA signal based on an MA signature. Alternatively, a UE may select NoMA parameters based on its own measurements. For example, the UE may select NoMA parameters that provide the highest SINR, and avoid NoMA parameters that provide the lowest SINR. Alternatively, the NoMA parameters may be a priori information to the UE. As yet another alternative, the NoMA parameters may be selected according to a combination of the above-mentioned signaling/selection techniques, e.g., a spreading matrix index may be explicitly signaled and a scrambling index may be derived from an MCS level.

In some embodiments, a UE may send NoMA related feedback to the base station. The feedback information may indicate that the UE used a different NoMA parameter (e.g., different index) than that which was signaled by the base station, such as when the UE selects the NoMA parameters based on its own measurements. The feedback information may also indicate measurement taken by the UE, such as an average, minimum, or maximum SINR for a selected set of NoMA reference signals. The measurements may be reported periodically. Alternatively, the measurements may be reported on-demand based on instructions received from the base station, according to a NoMA transmission (mode) initialization, when a NoMA transmission is configured, or when a UE performs an initialization/power-up procedure. The UE may explicitly signal the index of the NoMA signal used or the offset of the NoMA signal index received from base station side signaling. A base station can obtain information to derive NoMA signal being used from other information reported by UEs of the same base station and/or neighbor base stations or UEs of the neighboring base stations A UE may report to the base station an SINR in the absence of NoMA transmission, which may be used by the base station at network side for deriving the NoMA signal. The SINR report may indicate a best/worst/highest 'n' number or lowest 'm' number of SINR measurements corresponding to the NoMA signal, as well as an MCS level and desired NoMA signal parameters (including the MA signatures, e.g., $i_{1,2}$). Measurements/signaling from neighbor base station/UEs may be used for inter-cell and intra-cell interference mitigation. Cell-edge UEs of neighbor base stations may report the measurements (e.g., SINR) that can be used by the serving base station to avoid severe interference cause by its own cell-edge UEs to the cell-edge UEs of the neighboring cell.

Figure 9:
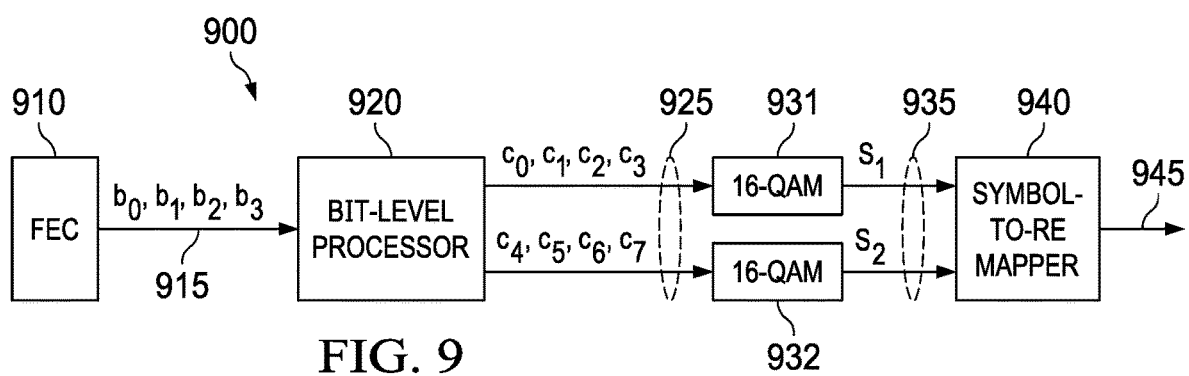
FIG. 9 is a diagram of another embodiment NoMA transmitter that uses a bit-level operation and QAM modulators to generate a NoMA signal.

Bit-level operations may be designed to emulate specific NoMA modulation schemes using various different techniques. FIG. 9 is a diagram of an embodiment transmitter 900 that uses a bit-level operation 920 in conjunction with parallel 16-QAM modulators 931, 932 to generate a NoMA signal 945. As shown, the embodiment transmitter 900 includes an FEC encoder 910, a bit-level processor 920, 16-QAM modulators 931, 932, and a symbol-to-RE mapper 940. In this example, the FEC encoder 910 generates an input bit-stream 915 that includes four bits ($b_0$, $b_1$, $b_2$, $b_3$), and forwards the input bit-stream 915 to the bit-level processor 920, which performs a bit-level operation to generate an output bit-stream 925 that includes eight bits ($c_0$, $c_1$, $c_2$, $c_3$, $c_4$, $c_5$, $c_6$, $c_7$). The output bit-stream 925 is then split into two subsets of bits, namely ($c_0$, $c_1$, $c_2$, $c_3$) and ($c_4$, $c_5$, $c_6$, $c_7$), which are modulated in parallel by the 16-QAM modulators 931, 932 to generate two symbols, namely $S_1$ and $S_2$ (respectively), that collectively form a sequence of symbols 935. The symbols $S_1$, $S_2$ are then mapped to a set of REs by the symbol-to-RE mapper 940 to obtain a NoMA signal 945, which is transmitted to a receiver, e.g., a UE or base station/NodeB.

Figure 10:
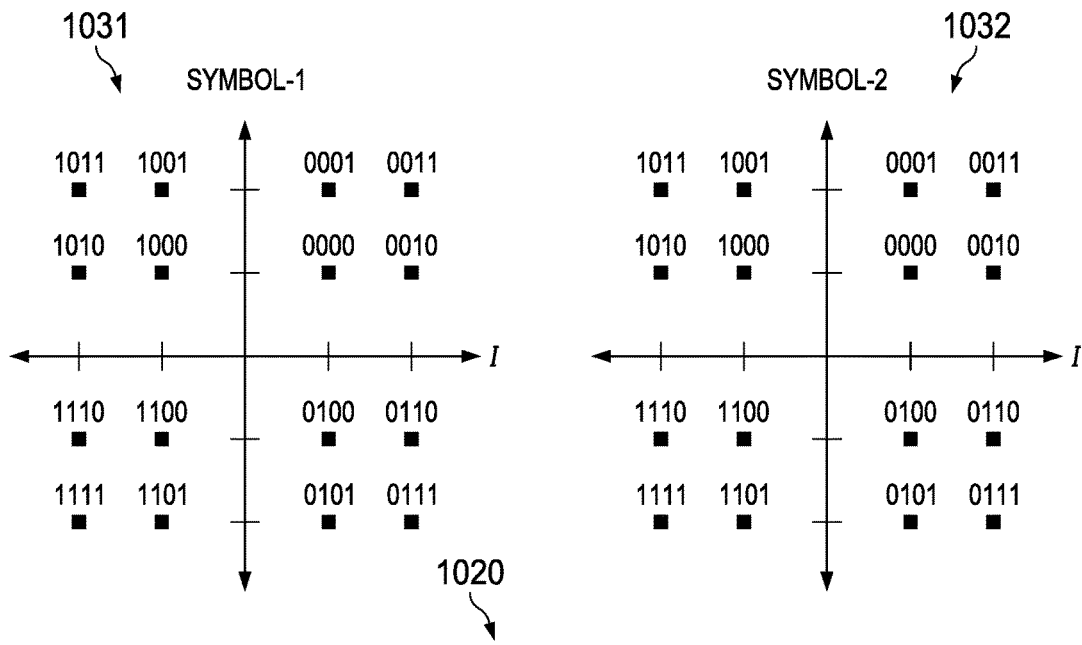
FIG. 10 is a diagram of a look-up table corresponding to an example bit-level operation and example constellation diagrams corresponding to QAM modulators used to generate the sequence of symbols in FIG. 9.

FIG. 10 depicts a look-up table 1020 and constellation diagrams 1031, 1032 for generating the sequence of symbols 935 in FIG. 9. The look-up table 1020 corresponds to a bit-level operation for emulating a 16-point SCMA codebook, namely: c=f($b_0$, $b_1$, $b_2$, $b_3$)=[($b_0$ XNOR $b_2$), $b_0$, ($b_1$ XNOR $b_3$), $b_2$, ($b_0$ XOR $b_2$), $b_0$, ($b_1$ XOR $b_3$), $b_2$]=[$c_0$, $c_1$, $c_2$, $c_3$, $c_4$, $c_5$, $c_6$, $c_7$], where c is the output bit-stream, f($b_0$, $b_1$, $b_2$, $b_3$) is the bit-level operation, $b_0$, $b_1$, $b_2$, and $b_3$ are input bit-values of the input bit-stream, $c_0$, $c_1$, $c_2$, $c_3$, $c_4$, $c_5$, $c_6$, and $c_7$ are output bit-values of the output bit-stream c, XOR is an exclusive OR (XOR) gate, XNOR is a logical compliment of an XOR gate. This particular bit-level operation can also be expressed in matrix form as follows:

$$c = \begin{bmatrix} 1 \\ 0 \\ 1 \\ 0 \\ 0 \\ 0 \\ 0 \\ 0 \end{bmatrix} + \begin{bmatrix} 1 & 0 & 1 & 0 \\ 1 & 0 & 0 & 0 \\ 0 & 1 & 0 & 1 \\ 0 & 0 & 1 & 0 \\ 1 & 0 & 1 & 0 \\ 1 & 0 & 0 & 0 \\ 0 & 1 & 0 & 1 \\ 0 & 0 & 1 & 0 \end{bmatrix} \begin{bmatrix} b_0 \\ b_1 \\ b_2 \\ b_3 \end{bmatrix} \bmod 2.$$

After using the bit-level operation to process the input bit-stream, the resulting output bit-stream may then be broken into two sub-sets of bits, namely [$c_0$, $c_1$, $c_2$, $c_3$] and [$c_4$, $c_5$, $c_6$, $c_7$], which may 16-QAM modulated individually to produce respective symbols in a pair of symbols: $S_1$=[$c_0$, $c_1$, $c_2$, $c_3$] and $S_2$=[$c_4$, $c_5$, $c_6$, $c_7$]. It should also be appreciated that the constellation diagrams 1031, 1032 are provided as examples, and that different constellation diagram configurations may be used to modulate the output bit-stream 925 into the sequence of symbols 935.

Figure 11:
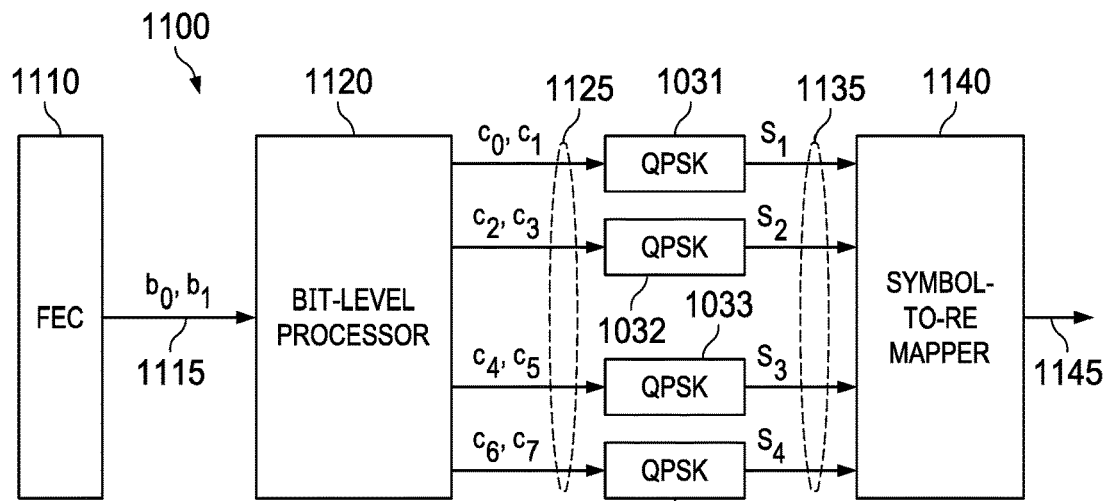
FIG. 11 is a diagram of another embodiment NoMA transmitter that uses a bit-level operation and QPSK modulators to generate a NoMA signal.

FIG. 11 is a diagram of an embodiment transmitter 1100 that uses a bit-level operation 1120 in conjunction with parallel 4-QAM modulators 1131-1134 to generate a NoMA signal 1145. As shown, the embodiment transmitter 1100 includes an FEC encoder 1110, a bit-level processor 1120, 4-QAM modulators 1131-1134, and a symbol-to-RE mapper 1140. In this example, the FEC encoder 1110 generates an input bit-stream 1115 that includes two bits ($b_0$, $b_1$), and forwards the input bit-stream 1115 to the bit-level processor 1120, which performs a bit-level operation to generate an output bit-stream 1125 that includes eight bits ($c_0$, $c_1$, $c_2$, $c_3$, $c_4$, $c_5$, $c_6$, $c_7$). The output bit-stream 1125 is then split into four subsets of bits, namely ($c_0$, $c_1$), ($c_2$, $c_3$), ($c_4$, $c_5$), and ($c_6$, $c_7$), which are modulated in parallel by the QPSK modulators 1131, 1132, 1134, and 1135 (respectively) to generate four symbols, namely $S_1$, $S_2$, $S_3$, and $S_4$ (respectively), that collectively form a sequence of symbols 1135. The symbols $S_1$, $S_2$, $S_3$, $S_4$ are then mapped to a set of REs by the symbol-to-RE mapper 1140 to obtain a NoMA signal 1145, which is transmitted to a receiver.

Although the embodiment transmitters 400, 900, and 1100 modulate sub-sets of output bits in the corresponding output bit-streams 425, 925, 1125 using parallel modulators, it should be appreciated that the embodiment transmitters 400, 900, and 1100 may be modified to include a single modulator that sequentially modulates each sub-set of output bits in the corresponding output bit-streams 425, 925, 1125.

Figure 12:
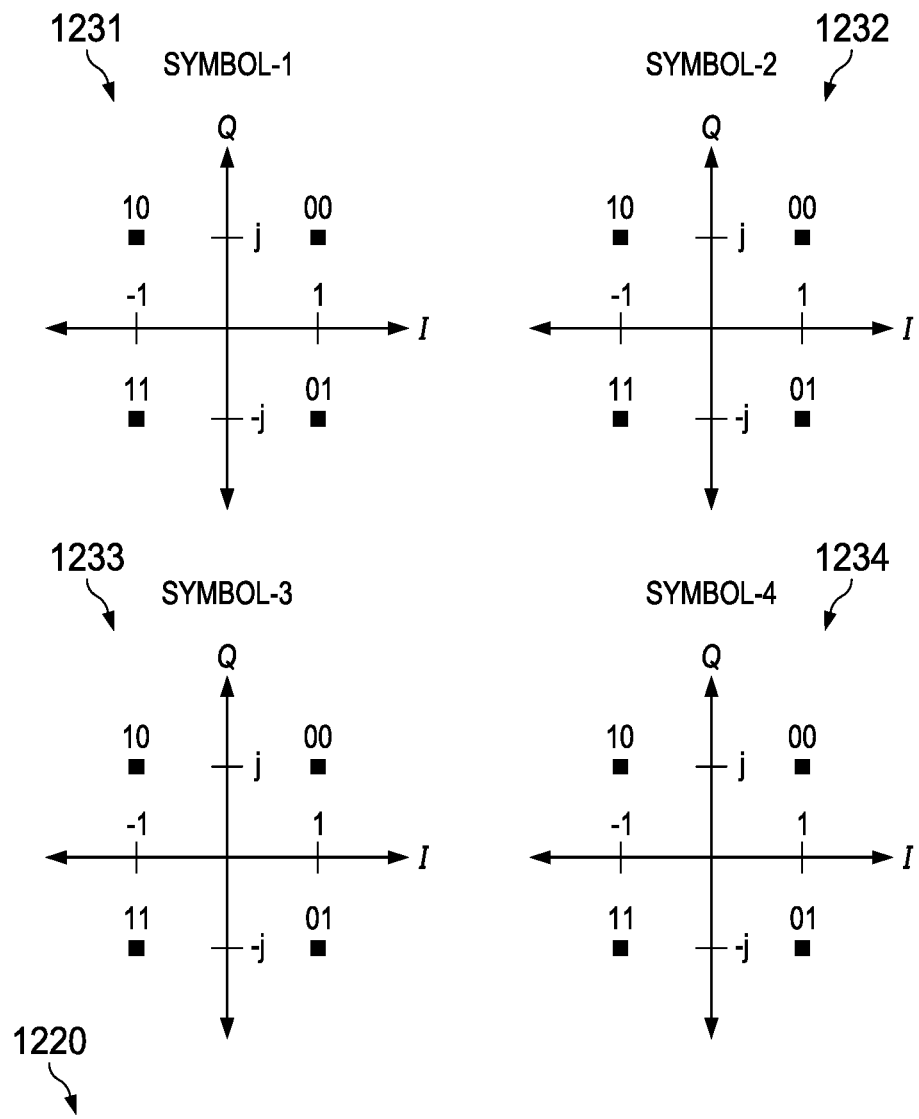
FIG. 12 is a diagram of a look-up table corresponding to an example bit-level operation and example constellation diagrams corresponding to QPSK modulators used to generate the sequence of symbols in FIG. 11.

FIG. 12 depicts a look-up table 1220 and constellation diagrams 1231, 1232, 1233, 1234 for generating the sequence of symbols 1135 in FIG. 11. The look-up table 1220 corresponds to a bit-level operation for emulating a 16-point SCMA codebook, namely: c=f($b_0$, $b_1$)=[$b_0$, $b_1$, $\overline{b_0}$, $\overline{b_1}$, $\overline{b_0}$, $b_1$, $b_0$, $\overline{b_1}$]=[$c_0$, $c_1$, $c_2$, $c_3$, $c_4$, $c_5$, $c_6$, $c_7$], where c is the output bit-stream, f($b_0$, $b_1$, $b_2$, $b_3$) is the bit-level operation, $b_0$ and $b_1$ are input bit-values of the input bit-stream, $\overline{b_0}$ and $\overline{b_1}$ are the complements of input bits $b_0$ and $b_1$ (respectively), $c_0$, $c_1$, $c_2$, . . . $c_7$ are output bit-values of the output bit-stream. This particular bit-level operation can also be expressed in matrix form as follows:

$$\begin{bmatrix} c_0 \\ c_1 \\ c_2 \\ c_3 \\ c_4 \\ c_5 \\ c_6 \\ c_7 \end{bmatrix} = \left( \begin{bmatrix} 0 \\ 0 \\ 1 \\ 1 \\ 1 \\ 0 \\ 0 \\ 1 \end{bmatrix} + \begin{bmatrix} 1 & 0 \\ 0 & 1 \\ 1 & 0 \\ 0 & 1 \\ 1 & 0 \\ 0 & 1 \\ 1 & 0 \\ 0 & 1 \end{bmatrix} \begin{bmatrix} b_0 \\ b_1 \end{bmatrix} \right) \bmod 2 = \begin{bmatrix} b_0 \\ b_1 \\ \overline{b_0} \\ \overline{b_1} \\ \overline{b_0} \\ b_1 \\ b_0 \\ \overline{b_1} \end{bmatrix} \text{ produces } \begin{pmatrix} s_1 \\ -s_1 \\ js_1 \\ -js_1 \end{pmatrix}.$$

In this example, the output bit-stream may be separated into four sub-sets of bits, namely [$c_0$, $c_1$], [$c_2$, $c_3$], [$c_4$, $c_5$] and [$c_6$, $c_7$], which may QAM modulated individually to produce four respective symbols: $S_1$=[$c_0$, $c_1$], $S_2$=[$c_2$, $c_3$], $S_3$=[$c_4$, $c_5$], $S_4$=[$c_6$, $c_7$]. In this way, all four symbols are associated with both bits. When the symbols are modulated according to the constellation diagrams 1231, 1232, 1233, and 1234, the relationship between symbols is as follows: $s_2$=−$s_1$, $s_3$=$js_1$ and $s_4$=−$js_1$ where j=$\sqrt{-1}$, meaning that the relationship between symbols is independent of the input bit values $b_0$ and $b_1$ such that the relationship between symbols is fixed, as is consistent with NOMA schemes that rely on linear spreading. It should also be appreciated that the constellation diagrams 1231, 1232, 1233, 1234 are provided as examples, and that different constellation diagram configurations may be used to modulate the output bit-stream 1125 into the sequence of symbols 1135.

Figure 13:
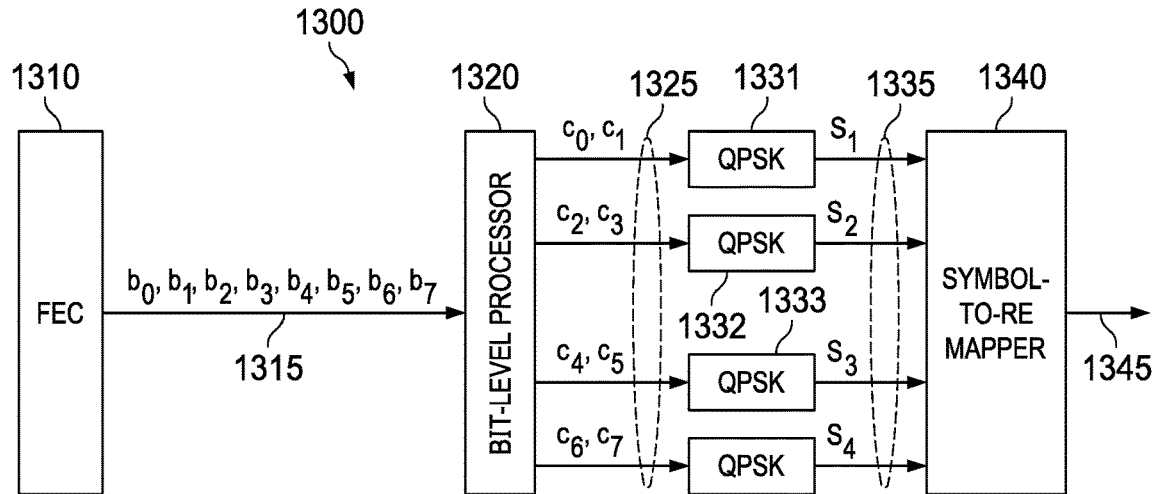
FIG. 13 is a diagram of another embodiment NoMA transmitter that uses a bit-level operation and QPSK modulators to generate a NoMA signal.

FIG. 13 is a diagram of an embodiment transmitter 1300 that uses a bit-level operation 1320 in conjunction with parallel QPSK modulators 1331, 1332, 1333, 1334 to generate a NoMA signal 1345. In this example, the FEC encoder 1310 generates an input bit-stream 1315 that includes eight bits ($b_0$, $b_1$, $b_2$, $b_3$, $b_4$, $b_5$, $b_6$, $b_7$), and forwards the input bit-stream 1315 to the bit-level processor 1320, which performs a bit-level operation to generate an output bit-stream 1325 that includes eight bits ($c_0$, $c_1$, $c_2$, $c_3$, $c_4$, $c_5$, $c_6$, $c_7$). The output bit-stream 1325 is then split into four subsets of bits, namely ($c_0$, $c_1$), ($c_2$, $c_3$), ($c_4$, $c_5$), and ($c_6$, $c_7$), which are modulated in parallel by the 4-QAM modulators 1331, 1332, 1333, and 1334 to generate four symbols, namely $S_1$, $S_2$, $S_3$, and $S_4$ (respectively), that collectively form a sequence of symbols 1335. The symbols $S_1$, $S_2$, $S_3$, $S_4$ are then mapped to a set of REs by the symbol-to-RE mapper 1340 to obtain the NoMA signal 1345, which is transmitted to a receiver.

Figure 14:
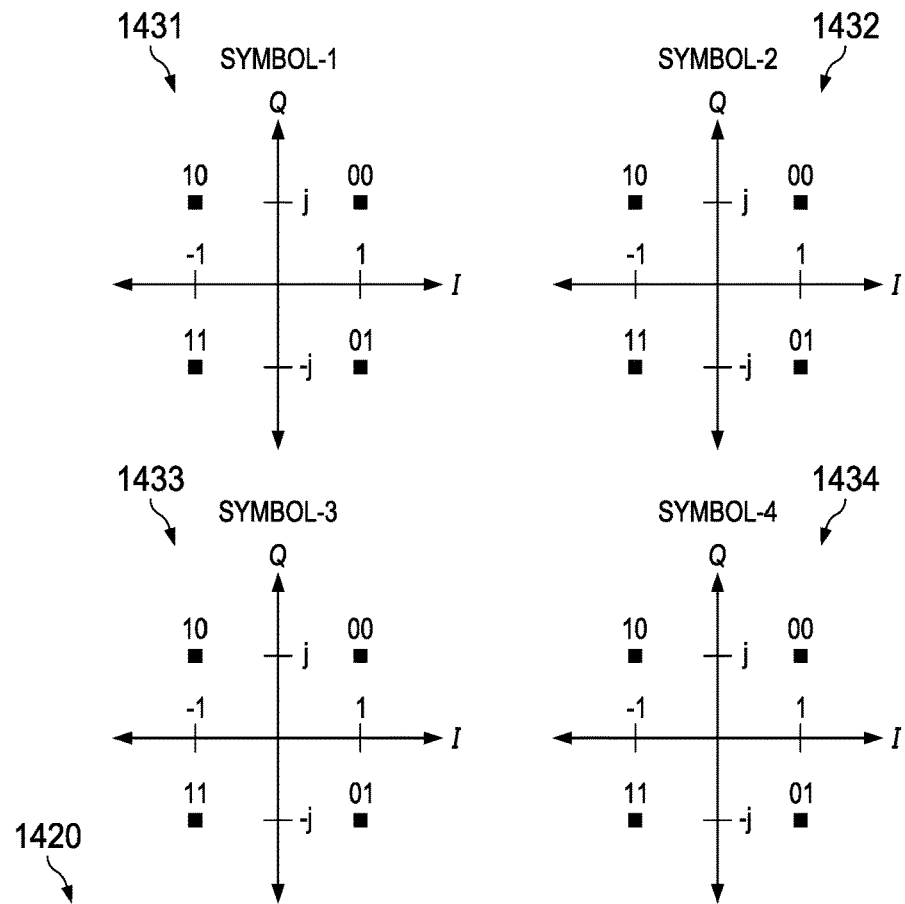
FIG. 14 is a diagram of a look-up table corresponding to an example bit-level operation and example constellation diagrams corresponding to QPSK modulators used to generate the sequence of symbols in FIG. 13.

FIG. 14 depicts a look-up table 1420 and constellation diagrams 1431, 1432, 1433, 1434 for generating the sequence of symbols 1335 in FIG. 13. The look-up table 1420 corresponds to a bit-level operation for emulating a scrambling operation, namely: c=f($b_0$, $b_1$, $b_2$, $b_3$, $b_4$, $b_5$, $b_6$, $b_7$)=[$b_0$, $b_1$, $\overline{b_2}$, $\overline{b_3}$, $\overline{b_4}$, $b_5$, $b_6$, $\overline{b_7}$]=[$c_0$, $c_1$, $c_2$, $c_3$, $c_4$, $c_5$, $c_6$, $c_7$], where c is the output bit-stream, f($b_0$, $b_2$, $b_3$, $b_4$, $b_5$, $b_6$, $b_7$) is the bit-level operation, $b_0$, $b_1$, . . . $b_7$ are input bit-values of the input bit-stream, $\overline{b_2}$, $\overline{b_3}$, $\overline{b_4}$, and $\overline{b_7}$ are the complements of input bits $b_2$, $b_3$, $b_4$, and $b_7$ (respectively), and $c_0$, $c_1$, $c_2$, $c_7$ are output bit-values of the output bit-stream. In this example, the output bit-stream may be separated into four sub-sets of bits, namely [$c_0$, $c_1$], [$c_2$, $c_3$], [$c_4$, $c_5$] and [$c_6$, $c_7$], which may be QAM modulated individually to produce four respective symbols: $S_1=[c_0, c_1]$, $S_2=[c_2, c_3]$, $S_3=[c_4, c_5]$, $S_4=[c_6, c_7]$. Depending on the scrambling operation chosen, the modulator will generate different symbol sequences from the same set of input bits $[b_0, b_1, b_2, b_3, b_4, b_5, b_6, b_7]$. For example, the symbol sequence $s_1,s_2,s_3,s_4$ is produced when using one scrambling operation and the symbol sequence $s_1,-s_2,js_3,-js_4$ is produced when using another scrambling operation. This symbol sequence $s_1,s_2,s_3,s_4$ and the symbol sequence $s_1,-s_2,js_3,-js_4$ are expressed in matrix form, respectively, as follows:

$$\begin{bmatrix} c_0 \\ c_1 \\ c_2 \\ c_3 \\ c_4 \\ c_5 \\ c_6 \\ c_7 \end{bmatrix} = \left( \begin{bmatrix} 0 \\ 0 \\ 1 \\ 1 \\ 1 \\ 0 \\ 0 \\ 1 \end{bmatrix} + I_8 \begin{bmatrix} b_0 \\ b_1 \\ b_2 \\ b_3 \\ b_4 \\ b_5 \\ b_6 \\ b_7 \end{bmatrix} \right) \bmod 2 = \begin{bmatrix} b_0 \\ b_1 \\ \overline{b_2} \\ \overline{b_3} \\ \overline{b_4} \\ b_5 \\ b_6 \\ \overline{b_7} \end{bmatrix} \text{ produces } \begin{pmatrix} s_1 \\ s_2 \\ s_3 \\ s_4 \end{pmatrix};$$

$$\begin{bmatrix} c_0 \\ c_1 \\ c_2 \\ c_3 \\ c_4 \\ c_5 \\ c_6 \\ c_7 \end{bmatrix} = \left( \begin{bmatrix} 0 \\ 0 \\ 0 \\ 0 \\ 0 \\ 0 \\ 0 \\ 0 \end{bmatrix} + I_8 \begin{bmatrix} b_0 \\ b_1 \\ b_2 \\ b_3 \\ b_4 \\ b_5 \\ b_6 \\ b_7 \end{bmatrix} \right) \bmod 2 = \begin{bmatrix} b_0 \\ b_1 \\ b_2 \\ b_3 \\ b_4 \\ b_5 \\ b_6 \\ b_7 \end{bmatrix} \text{ produces } \begin{pmatrix} s_1 \\ -s_2 \\ js_3 \\ -js_4 \end{pmatrix},$$

where $I_8$ is an 8×8 identity matrix. As such, the 4-QAM standard modulator produced symbols has imposed a "unique identifier/signature" to the symbol sequence, i.e., $s_1,s_2,s_3,s_4$ as opposed to $s_1,-s_2,js_3,-js_4$. The signature which has been imposed among symbols through a bit level operation will facilitate the multi-user detector to mitigate the inter-user/multi-stream interference. It should be appreciated that the bit-level operations described above are only some of the many possible examples that can be used in combination with QAM modulation to generate NoMA signals. It should also be appreciated that the constellation diagrams 1431, 1432, 1433, 1434 are provided as examples, and that different constellation diagram configurations may be used to modulate the output bit-stream 1325 into the sequence of symbols 1335. It should be appreciated that the bit-level processor 1320 does not increase the number of bits when converting the input bit-stream 1315 into the output bit-stream 1325, and consequently the input bit-stream 1315 has the same length as the output bit-stream 1325.

It should be appreciated that the bit-level operations described above are only some of the many possible examples that can be used in combination with QAM modulation to generate NoMA signals. Table 1 lists additional example bit-level operations:

TABLE 1

| Ref. Index | Bit level operations $f(b_0, b_1, \ldots b_n)$ | Output $(c_0, c_1, \ldots c_n)$ |
| --- | --- | --- |
| 1 | $f(b_0, b_1)$ | $\overline{b_0}, b_1$ |
| 2 | $f(b_0, b_1, b_2)$ | $(b_0 \text{ XOR } b_2), b_1, b_2$ |
| 3 | $f(b_0, b_1, b_2)$ | $b_1, b_2, (b_0 \text{ XOR } b_2), b_2$ |

TABLE 1-continued

| Ref. Index | Bit level operations $f(b_0, b_1, \ldots b_n)$ | Output $(c_0, c_1, \ldots c_n)$ |
| --- | --- | --- |
| 4 | $f(b_0, b_1, b_2, b_3)$ | $(b_0 \text{ XNOR } b_2), b_0, (b_1 \text{ XNOR } b_3), b_2$ |
| 5 | $f(b_0, b_1, b_2, b_3)$ | $(b_0 \text{ XOR } b_2), b_0, (b_1 \text{ XOR } b_3), b_2$ |
| 6 | $f(b_k)$ | $(b_k + 1) \bmod 2$ |

The following vector/bit stream operation is equivalent to equation one (1) in Table 1:

$$\begin{pmatrix} b_0 \\ b_1 \end{pmatrix} XOR \begin{pmatrix} 1 \\ 0 \end{pmatrix} = \begin{pmatrix} \overline{b_0} \\ b_1 \end{pmatrix},$$

$b_0 b_1 \text{ XOR } 10 = \overline{b_0} b_1$.

The following matrix equations are equivalent to bit level operation three (3) in Table 1:

$$\begin{bmatrix} c_0 \\ c_1 \\ c_2 \\ c_3 \end{bmatrix} = \left( \begin{bmatrix} 1 & 0 & 1 \\ 0 & 0 & 1 \\ 0 & 1 & 0 \\ 0 & 0 & 1 \end{bmatrix} \begin{bmatrix} b_0 \\ b_1 \\ b_2 \end{bmatrix} \right) \bmod 2 = \begin{bmatrix} b_0 + b_2 \\ b_2 \\ b_1 \\ b_2 \end{bmatrix} \bmod 2;$$

$$\begin{bmatrix} c_0 \\ c_1 \\ c_2 \\ c_3 \end{bmatrix} = \left( \begin{bmatrix} b_2 \\ 0 \\ 0 \\ 0 \end{bmatrix} + \begin{bmatrix} 1 & 0 & 0 \\ 0 & 0 & 1 \\ 0 & 1 & 0 \\ 0 & 0 & 1 \end{bmatrix} \begin{bmatrix} b_0 \\ b_1 \\ b_2 \end{bmatrix} \right) \bmod 2 = \begin{bmatrix} b_0 + b_2 \\ b_2 \\ b_1 \\ b_2 \end{bmatrix} \bmod 2.$$

The following matrix equation is equivalent to bit level operation four (4) in Table 1

$$\begin{bmatrix} c_0 \\ c_1 \\ c_2 \\ c_3 \end{bmatrix} = \left( \begin{bmatrix} 1 \\ 0 \\ 1 \\ 0 \end{bmatrix} + \begin{bmatrix} 1 & 0 & 1 & 0 \\ 1 & 0 & 0 & 0 \\ 0 & 1 & 0 & 1 \\ 0 & 0 & 1 & 0 \end{bmatrix} \begin{bmatrix} b_0 \\ b_1 \\ b_2 \\ b_3 \end{bmatrix} \right) \bmod 2.$$

In some embodiments, bit-processing operations may emulate symbol spreading. Symbol spreading is conventionally performed by multiplying modulated symbols by real/complex coefficients. For instance, the following equation is an example of symbol spreading: $\times s_1 = [s_1, -s_1, js_1, -js_1]^T$ where $(.)^T$ is the transpose operation. Table 2 lists examples of bit-level operations that emulate symbol spreading:

TABLE 2

| Ref. Index | Bit level operations $f(b_0, b_1, \ldots b_n)$ | Output $(c_0, c_1, \ldots c_n)$ |
| --- | --- | --- |
| 1 | $f(b_0, b_1)$ | $\overline{b_0}, \overline{b_1}$ |
| 2 | $f(b_0, b_1)$ | $\overline{b_0}, b_1,$ |
| 3 | $f(b_0, b_1)$ | $b_0, \overline{b_1}$ |
| 4 | $f(b_0, b_1)$ | $[b_0, b_1, \overline{b_0}, \overline{b_1}, \overline{b_0}, b_1, b_0, \overline{b_1}]$ |

Bit level operations that emulate symbol spreading can also be expressed in matrix form. For example, the following scrambling functions are equivalent to bit level operation four (4) in Table 2:

$$\begin{bmatrix} c_0 \\ c_1 \\ c_2 \\ c_3 \\ c_4 \\ c_5 \\ c_6 \\ c_7 \end{bmatrix} = \left( \begin{bmatrix} 0 \\ 0 \\ 1 \\ 1 \\ 1 \\ 0 \\ 0 \\ 1 \end{bmatrix} + \begin{bmatrix} 1 & 0 \\ 0 & 1 \\ 1 & 0 \\ 0 & 1 \\ 1 & 0 \\ 0 & 1 \\ 1 & 0 \\ 0 & 1 \end{bmatrix} \begin{bmatrix} b_0 \\ b_1 \end{bmatrix} \right) \bmod 2 = \begin{bmatrix} b_0 \\ b_1 \\ \overline{b_0} \\ \overline{b_1} \\ \overline{b_0} \\ b_1 \\ b_0 \\ \overline{b_1} \end{bmatrix}.$$

It should be appreciated that different spreading length and modulation order/number of input bits can be supported by different vector/matrix sizes.

Bit-processing operations can be configured to emulate both linear and non-linear spreading. In non-linear spreading, the relationship between symbols is dependent on the values of the input bits, meaning that a change in a value of an input bit effectively modifies the relationship between symbols resulting from QAM modulation. In linear spreading, the relationship between symbols is independent from the values of the input bits, meaning that the relationship between symbols remains fixed irrespective of the input bit values.

In some embodiments, bit-level operations may emulate scrambling and/or spreading in the symbol domain. A generic example of a bit processing operation that emulates scrambling and/or spreading can be expressed as follows: $c = (s + M \cdot b) \bmod 2$, where $c$ is the output bit-stream, $s \in \mathbb{C}^\wedge(k \times 1)$ is a scrambling vector, $M \in \mathbb{C}^\wedge(k \times r)$ is a bit mapping or spreading matrix, and $b$ is the input bit-stream values. As can be appreciated, the bit mapping matrix (i.e., M) determines the number of output bits and the ordering of output bits in the output bit stream as well as their relationship to the input bit stream, and the scrambling vector (i.e., s) may be used to modify the phase of, or phase relationship between, symbols in the resulting sequence of symbols that forms the NoMA signal. The number of input bits to the bit level processor is referred to as the rank of the NoMA signal (r).

Multiple streams output from the bit processor can be processed parallel or series by the modulator to generate the symbols. Moreover, the number of columns in M or number of rows in b represents the number of input bits that are scrambled and/or spread, which corresponds to the rank of the NoMA signal. In some embodiments, the number of columns in M specifies or is associated to the modulation order. Likewise, the number of rows in M and/or number of rows in s represents the spreading length in bits. Table 3 includes examples of bit-level operations that emulate scrambling sequences:

TABLE 3

| index | Scrambling sequence | Symbol Sequence relationship |
|---|---|---|
| 1 | $[0\ 0\ 0\ 0\ 0\ 0\ 0\ 0]^T$ | $[1\ 1\ 1\ 1]$ |
| 2 | $[0\ 0\ 1\ 1\ 0\ 0\ 0\ 0]^T$ | $[1\ -1\ 1\ 1]$ |
| 3 | $[0\ 0\ 0\ 0\ 1\ 1\ 0\ 0]^T$ | $[1\ 1\ -1\ 1]$ |
| 4 | $[0\ 0\ 0\ 0\ 0\ 0\ 1\ 1]^T$ | $[1\ 1\ 1\ -1]$ |
| 5 | $[0\ 0\ 1\ 0\ 0\ 0\ 1\ 0]^T$ | $[1\ j\ 1\ j]$ |
| 6 | $[0\ 0\ 1\ 0\ 1\ 1\ 1\ 0]^T$ | $[1\ j\ -1\ j]$ |
| 7 | $[0\ 0\ 1\ 0\ 0\ 0\ 0\ 1]^T$ | $[1\ j\ 1\ -j]$ |
| 8 | $[0\ 0\ 0\ 1\ 0\ 0\ 1\ 0]^T$ | $[1\ -j\ 1\ j]$ |
| 9 | $[0\ 0\ 0\ 0\ 1\ 0\ 1\ 0]^T$ | $[1\ 1\ j\ j]$ |
| 10 | $[0\ 0\ 1\ 1\ 1\ 0\ 1\ 0]^T$ | $[1\ -1\ j\ j]$ |
| 11 | $[0\ 0\ 0\ 0\ 1\ 0\ 0\ 1]^T$ | $[1\ 1\ j\ -j]$ |
| 12 | $[0\ 0\ 0\ 0\ 1\ 1\ 0]^T$ | $[1\ 1\ -j\ j]$ |
| 13 | $[0\ 0\ 1\ 0\ 1\ 0\ 0\ 0]^T$ | $[1\ j\ j\ 1]$ |
| 14 | $[0\ 0\ 1\ 0\ 1\ 0\ 1\ 1]^T$ | $[1\ j\ j\ -1]$ |
| 15 | $[0\ 0\ 1\ 0\ 0\ 1\ 0\ 0]^T$ | $[1\ j\ -j\ 1]$ |
| 16 | $[0\ 0\ 0\ 1\ 1\ 0\ 0\ 0]^T$ | $[1\ -j\ j\ 1]$ |

Non-linear spreading can be further refined for larger MA signature pool generation or better separation of transmissions. Table 4 provides examples of MA signatures based on different scrambling sequences (s) for the following bit-level operation:

$$\begin{bmatrix} c_0 \\ c_1 \\ c_2 \\ c_3 \end{bmatrix} = \left( s + \begin{bmatrix} 1 & 0 & 0 \\ 0 & 1 & 0 \\ 0 & 1 & 0 \\ 0 & 0 & 1 \end{bmatrix} \begin{bmatrix} b_0 \\ b_1 \\ b_2 \end{bmatrix} \right) \bmod 2 = \begin{bmatrix} b_0 \\ b_1 \\ b_1 \\ b_2 \end{bmatrix}.$$

TABLE 4

| index | Scrambling Sequence s | Symbol sequence |
|---|---|---|
| 1 | $[0\ 0\ 0\ 0]^T$ | $[s_1\ s_2]$ |
| 2 | $[0\ 0\ 1\ 1]^T$ | $[s_1\ -s_2]$ |
| 3 | $[0\ 0\ 1\ 0]^T$ | $[s_1\ js_2]$ |
| 4 | $[0\ 0\ 0\ 1]^T$ | $[s_1\ -js_2]$ |

In some embodiments, bit level processing operations may extend the MA signature pool based on the following equations: $M = I\_(r \times r)$, where $I\_(r \times r)$ represents the identity matrix of size r. M can be row permutations of $I\_(r \times r)$. Scrambling sequences can be generated by random techniques, e.g., an LTE scrambler, a Gold sequence, a PN sequence, computer search sequences, etc. Scrambling sequences generated from random techniques can be used with any spreading matrix during bit-level processing.

Different bit-level operations may be used to emulate different NoMA schemes/codebooks. Table 5 provides an example of different bit-level operations for different NoMA schemes/codebooks.

TABLE 5

| Rank r | Spreading matrix M | Symbol-domain effect |
|---|---|---|
| 2 | $[I_{r \times r} \cdots I_{r \times r}]^T$ | Linear spreading |
| 3 | $\begin{bmatrix} 1 & 0 & 0 \\ 0 & 1 & 0 \\ 0 & 1 & 0 \\ 0 & 0 & 1 \end{bmatrix}$ | Non-linear spreading |
| 4 | $I_{4 \times 4}$ and permutations of $I_{4 \times 4}$ | Bit-level interleaving |
| 4 | $\begin{bmatrix} 1 & 0 & 1 & 0 \\ 1 & 0 & 0 & 0 \\ 0 & 1 & 0 & 1 \\ 0 & 0 & 1 & 0 \end{bmatrix}$ | Non-linear spreading |
| $r \geq 5$ | $I_{r \times r}$ and permutations of $I_{r \times r}$ | Bit-level interleaving |

In some embodiments, a bit-level operation may emulate both spreading and scrambling in the symbol-domain. Additionally, a sub-set of possible combinations may be statically, dynamically or semi-statically/semi-dynamically configured through signaling such as radio resource control (RRC), downlink control information (DCI), MAC-CE (control element). Example parameters include MCS, a number of UEs/streams being simultaneously served by the base station or related parameters such as the traffic load, transport block size (TBS), etc. Example metrics include spectral efficiency, block error rate (BLER), application scenarios, required KPI, PAPR requirement, etc.

Scrambling sequences can be a priori information that is listed in a look up table or otherwise generated using random techniques, e.g., similar to an LTE scrambler, gold sequence, PN sequence, etc. Choice of scrambling sequence used for given spreading matrix may be further refined to achieve specific performance targets such as peak-to-average power ratio (PAPR) requirements, target MCS levels, target spectral efficiency levels, spreading length, target BLER, a target number of UEs/streams being simultaneously served by the base station or related parameters such as the traffic load, a single or multiple streams per UE. A scrambling sequence and/or the rank of the NoMA signal may be NoMA parameters, and may be selected by either of the base station or the UE. In some embodiments, NoMA parameters (e.g., scrambling sequence, rank of the NoMA signal, etc.) may be explicitly signaled between the base station and UE(s). In other embodiments, NoMA parameters are derived from signaling information exchanged between the base station and UE(s) and/or measurements taken by UE(s) and/or base station.

In some embodiments, the MA signature is defined by s, M, or an s-M pair. A list of candidate MA signatures and/or MA signature parameters (s, M, or s-M pairs) may be communicated from the base station to the UEs and stored by the UE as a look-up-table. In some embodiments, an indication (e.g., MA signature constraint) is communicated from the base station to the UE in order to narrow down the candidate MA signatures that are available for selection by the UE. In one example, the indication (e.g., MA signature constraint) includes a rank of the spreading matrix and/or NoMA signal, which may implicitly indicate the modulation order. In some examples, the MA signature is selected by the UE based on a UE id. Other examples are also possible. In some embodiments, the UE makes the selection of the MA signature out of a plurality of such signatures. The UE may indicate or report the selection to the network explicitly, for example as detailed above, or alternatively, it can be implicit, for example, by making the selection linked to UE identifier using a pre-configured mapping. In some embodiments, the MA signature may also be mapped to the pilot/reference signal transmitted by the UE and hence, implicitly reported to the base station. Other explicit or implicit possibilities exist for signaling the selection to the network.

In some embodiments, the MA signature and/or MA signature parameters (s, M, or s-M pairs) is selected by the base station, or some other network device, and an indication associated with the MA signature and/or MA signature parameters (s, M, or s-M pairs) are communicated to the UE. In some embodiments, a given indication (e.g., a binary reference number, a flag bit, etc.) may be pre-associated with a specific MA signature and/or specific MA signature parameter(s). Additionally or alternatively, a given indication (e.g., a binary reference number, a flag bit, etc.) may be pre-associated with communication parameters (e.g., Spectral efficiency, MCS, etc.), which can be used by the UE to select the MA signature and/or MA signature parameter(s), or otherwise identify an MA signature and/or specific MA signature parameter(s) selected by the base station.

In some embodiments, the network indications (explicit or implicit) described above which are provided to the UE can be conveyed semi-statically using radio resource control (RRC), higher layer signaling or based on dynamic signaling (e.g. downlink control information (DCI) signaling) or MAC CE (control element) or any combination thereof. Other possibilities exist for the network indications. In other embodiments, the UE indications (explicit or implicit) described above which are provided to the network can be conveyed using pilot signals or other reference signals. Other possibilities exist for the UE indications as well.

Figure 15:
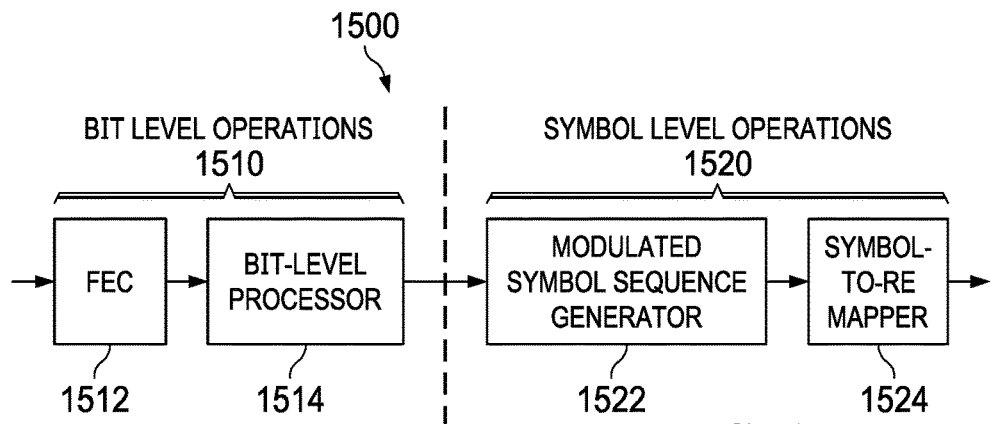
FIG. 15 is a diagram of a proposed non-orthogonal multiple access scheme, according to some embodiments.

FIG. 15 is a schematic diagram of a non-orthogonal multiple access communication system according to embodiments of the present disclosure. The system comprises a transmitter 1500, in which bit-level operations 1510 are performed by a forward error correction (FEC) encoder 1512 and a bit-level processor 1514, which may perform interleaving as well as scrambling bit-level operations, as well as bit-level operations that emulate symbol level operations, e.g., symbol-level scrambling, spreading, etc. Also, in the transmitter 1500, symbol-level operations 1520 are performed by a modulated symbol sequence generator 1522 and a symbol-to-resource element (RE) mapper 1524.

In embodiments of the present disclosure, each of the operations or sub-operations of the transmitter 1500 may be defined by one or more MA signatures, where each MA signature comprises a configuration for at least one of the operations or sub-operations. These defined MA signatures may be used to facilitate decoding the data transmitted from multiple multiplexed UEs.

Symbol-level operations may include spreading which can be linear or non-linear. Linear spreading refers to the case in which the spread symbols Y are related to the modulated symbols X(b), where b denotes the input coded bits, through the equation Y=S·X(b), where S denotes a spreading sequence that is independent of the modulated symbols.

Non-linear spreading refers to the case in which the spread symbols Y are related to the modulated symbols X(b), where b denotes the input coded bits, through the equation Y=S(X(b))·X(b), where S denotes a spreading sequence that depends on the modulated symbols.

Non-orthogonal multiple access schemes without spreading rely on complex receivers to decode the data of multiplexed UEs. The non-spreading multiple access decoding is typically based on the power-domain separation of the users.

Non-orthogonal multiple access schemes with spreading provide additional code domain separation for better inter-user interference suppression. Linear spreading generally comprises performing symbol-level repetition and optimization of spreading sequences, which is typically sufficient to separate data from some colliding UEs.

Non-linear spreading, on the other hand, provides higher spectral efficiency and supports a larger number of colliding UEs because of its additional coding gain and/or diversity gain.

Non-linear spreading, however, generally causes the non-orthogonal multiple access method to become difficult to implement in practical transmitters and receivers. Embodiments of the present disclosure provide implementations of non-linear spreading approaches based on linear operations. In addition, embodiments of the present disclosure provide unified frameworks for implementing any general non-orthogonal multiple access scheme. Accordingly, the embodiments of the present disclosure are relatively simple and efficient to implement in practical transmitters and receivers.

Figure 16A:
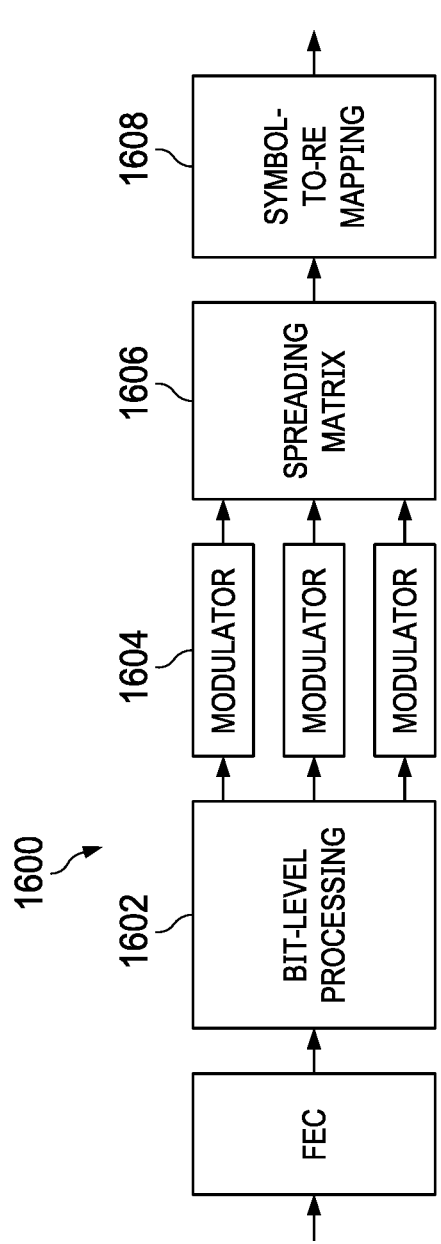
FIG. 16A is a diagram of a transmitter configured to generate data symbols for transmission on a communication channel, according to some embodiments.

FIG. 16A is a schematic diagram of a multiple access communication system according to an embodiment of the present disclosure. In the example of FIG. 16A, the multiple access communication system is a transmitter 1600 configured to generate data symbols for transmission on a communication channel. The data symbols are associated with a particular UE; therefore, the transmitter 1600 is also configured to map each of those data symbols to physical resource elements that are pre-configured, assigned, or scheduled for that particular UE.

In an embodiment, the transmitter 1600 comprises a bit-level processor 1602 for performing pre-modulation, bit-level operations. The transmitter 1600 obtains a first bit sequence and the bit-level processor 1602 processes the first bit sequence to generate at least two further bit sequences.

The obtained first bit sequence may optionally, for example, be obtained from a FEC encoder, in which case the first bit sequence is a FEC encoded binary bit sequence.

The transmitter 1600 further comprises a modulator 1604 for modulating each of the at least two further bit sequences to generate at least two symbol sequences. In example embodiments, the modulator 1604 is configured to perform quadrature amplitude modulation (QAM), such as QPSK/4-QAM, 8-QAM, 16-QAM, 64-QAM, 256-QAM, etc.

The modulator 1604 may be implemented by using multiple instances of a single modulator, where each single modulator has one input for receiving a bit sequence and one output for providing a symbol sequence. Alternatively, the modulator 1604 may be implemented as one or more aggregate entities each comprising parallel inputs for receiving separate bit sequences, parallel outputs for providing separate symbol sequences, and separate parallel internal processes for modulating bit sequences to generate symbols.

The transmitter 1600 further comprises a spreading matrix 1606 for spreading each of the at least two symbol sequences to generate a spread symbol sequence. In various embodiments of the present disclosure, as discussed in more detail below, the functions of some or all of the bit-level processor 1602, the modulator 1604, and the spreading matrix 1606 may be combined into a single-stage processor comprising a spreading matrix configured to additionally perform bit processing and modulating functions. For example, the symbol-level functions of the modulator 1604 and the spreading matrix 1606 may be combined in an equivalent manner to the combined symbol-level functions of the modulated symbol sequence generator.

The transmitter 1600 further comprises a resource element (RE) mapper 1608 for mapping each symbol of the spread symbol sequence to an RE of the communication channel. The RE mapper 1608 comprises, for example, one or more symbol-to-RE mapping rules, which may be sparse mapping rules or non-sparse mapping rules.

In various embodiments of the present disclosure, as discussed in more detail below, the functions of the spreading matrix 1606 and the RE mapper 1608 may be combined into a single-stage processor comprising a spreading matrix configured to additionally perform bit processing and modulating functions.

In the example of FIG. 16A, the bit-level processor 1602 has one input for receiving the first bit sequence, and has three outputs for providing three further bit sequences. In other embodiments of the present disclosure, however, the bit-level processor 1602 may be configured to have two outputs for providing two further bit sequences, or more than three outputs for providing more than three further bit sequences.

Once the transmitter 1600 has generated and mapped symbols to REs, the transmitter 1600 may transmit the symbols on physical resources of the communication channel according to each mapped resource element.

Figure 16B:
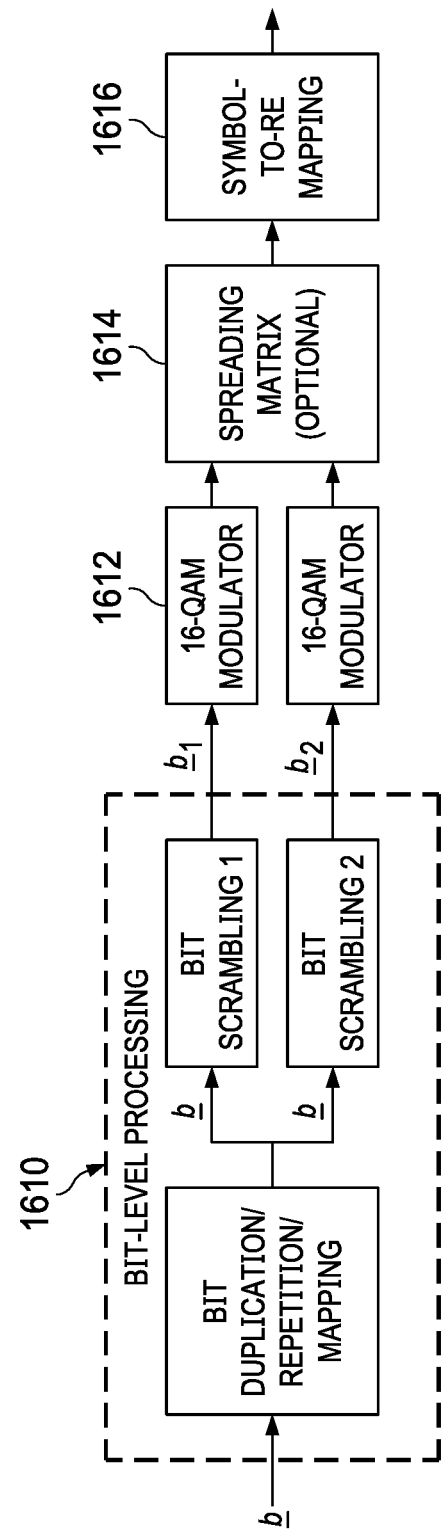
FIG. 16B is a diagram of a transmitter configured to generate data symbols for transmission on a communication channel, according to other embodiments.

FIG. 16B illustrates a further embodiment of the present disclosure. In the example of FIG. 16B, a more detailed bit-level processor 1610 is shown. In this example, the input bits b are duplicated at the outputs of the bit-level processor 1610, giving exactly the same sequence of bits at each output. Then, each sequence of bits b are scrambled to generate two sequences of scrambled bits $b_1$ and $b_2$ to be fed into two 16-QAM modulators 1612. This method, in general, may be used to execute a constellation relabeling method for implementing an SCMA codebook.

As an example, for generating an SCMA 16-point codebook, the scrambled sequences can be obtained from the input sequence using the following equations: $\underline{b}=b(i)b(i+1)b(i+2)b(i+3)$; $\underline{b_1}=b(i+1)b(i+3)$ (b(i) XNOR b(i+1)) (b(i+2) XNOR b(i+3)); $\underline{b_2}=b(i)b(i+2)$ (b(i) XOR b(i+1)) (b(i+2) XOR b(i+3)).

There may be an optional spreading matrix 1614 after the modulators 1612, and symbol-to-RE mapping 1616 will map the generated symbols to the corresponding resource elements based on a provided rule.

FIG. 16C illustrates another embodiment of the present disclosure. In this example, the input bit stream $b_0 b_1 b_2$ is first duplicated and then interleaved to generate the bit sequence of $b_0 b_0 b_1 b_1 b_2 b_2$. Next, subsets of this sequence are mapped to QPSK modulators 1618. In this example, the mapped subsets are non-overlapping and they have each bit repeated twice in each of the output sequences. Then, a spreading matrix 1620 is applied to the sequences of modulated symbols and the spread symbols are mapped to corresponding resource elements based on a provided rule of the symbol-to-RE mapper 1622. If a component spreading matrix, in which each element is rotated by −45 degrees, is used as a spreading matrix, the SCMA 8-point codebook can be generated using this procedure.

FIG. 16D illustrates another embodiment of the present disclosure. In this example, the input bits $b_0 b_1 b_2 b_3$ are duplicated/split into four sub-streams at the output of the bit-level processor 1624. Then, each sequence of bits is scrambled/interleaved by scramblers/interleavers 1626 to generate four sequences of scrambled/interleaved bits to be fed into QPSK/4-QAM modulators 1628. The output symbol streams of the QPSK/4 QAM modulators 1628 are fed to the spreading matrix 1630. This method may be used to implement a method of constellation symbol generation used in an SCMA codebook. As an example, for generating a SCMA 16-point codebook, the scrambled sequences can be obtained from the input sequences of $b_1 b_3$, $b_0 b_2$, $b_0 b_2$ and $c_1 c_3$, where $c_1 = b_1$ and $c_3 = b_3$, respectively, and the spreading matrix can be obtained from:

$$W = \frac{\sqrt{2}}{\sqrt{10}} \begin{pmatrix} 2 & 1 \\ 2 & 1 \\ 2 & 1 \\ 2 & 1 \end{pmatrix}$$

and the modulators are QPSK/4 QAM modulators. The symbol-to-RE mapper 1632 will map the generated symbols to the corresponding resource elements based on a provided rule.

FIG. 16E illustrates another embodiment of the present disclosure. In this example, the input bits $b_0 b_1 b_2 b_3$ are split into two sub-streams at the output of the bit-level processor 1634. Then, each sequence of bits is scrambled/interleaved by scramblers/interleavers to generate two sequences of scrambled/interleaved bits to be fed into QPSK/4-QAM modulators 1636. The output symbol streams of the QPSK/4 QAM modulators 1636 are fed to the spreading matrix 1638. This method may be used to implement a method for 16 QAM constellation symbol generation. As an example, for generating 16 QAM constellation symbols, the bit-level processed sequences to be fed to the modulators can be obtained from the input sequence using the following equations: $b_0 b_1$, $[b_0 \text{XNOR } b_2][b_1 \text{XNOR } b_3]$, $$W = \frac{\sqrt{2}}{\sqrt{10}} \begin{pmatrix} 2 & 1 \\ 2 & 1 \end{pmatrix}$$

and the modulators are QPSK/4 QAM modulators and W denotes the spreading matrix.

Figure 17:
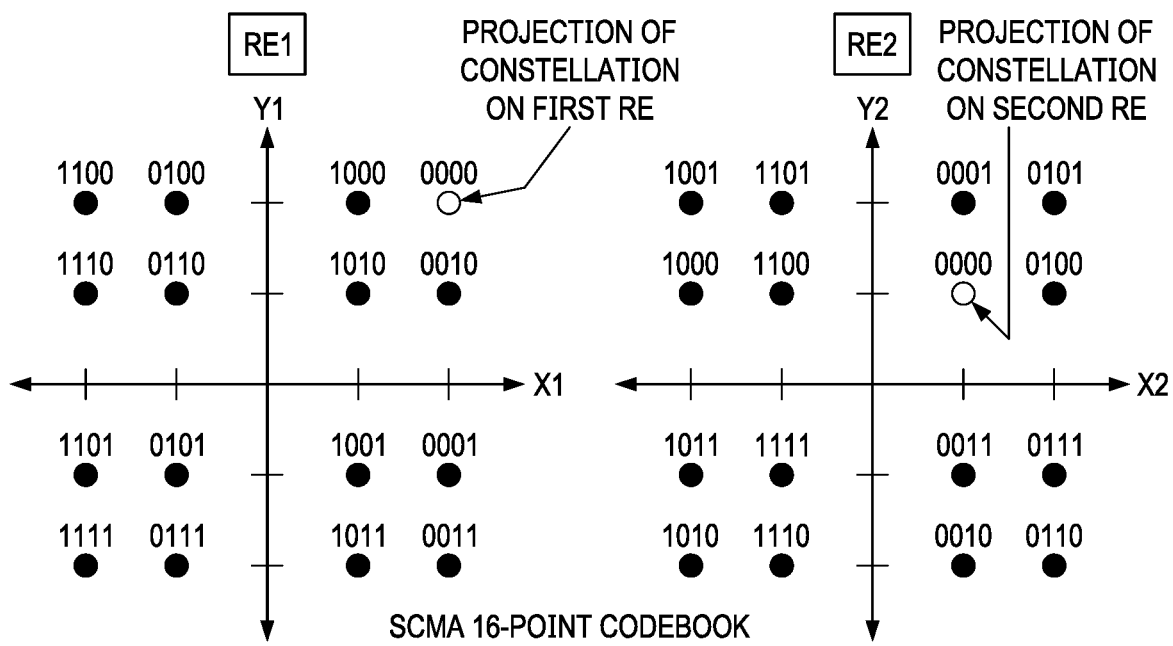
FIG. 17 is a diagram of constellation diagrams of two successive REs used in a 16-point SCMA codebook, according to some embodiments.
Figure 18:
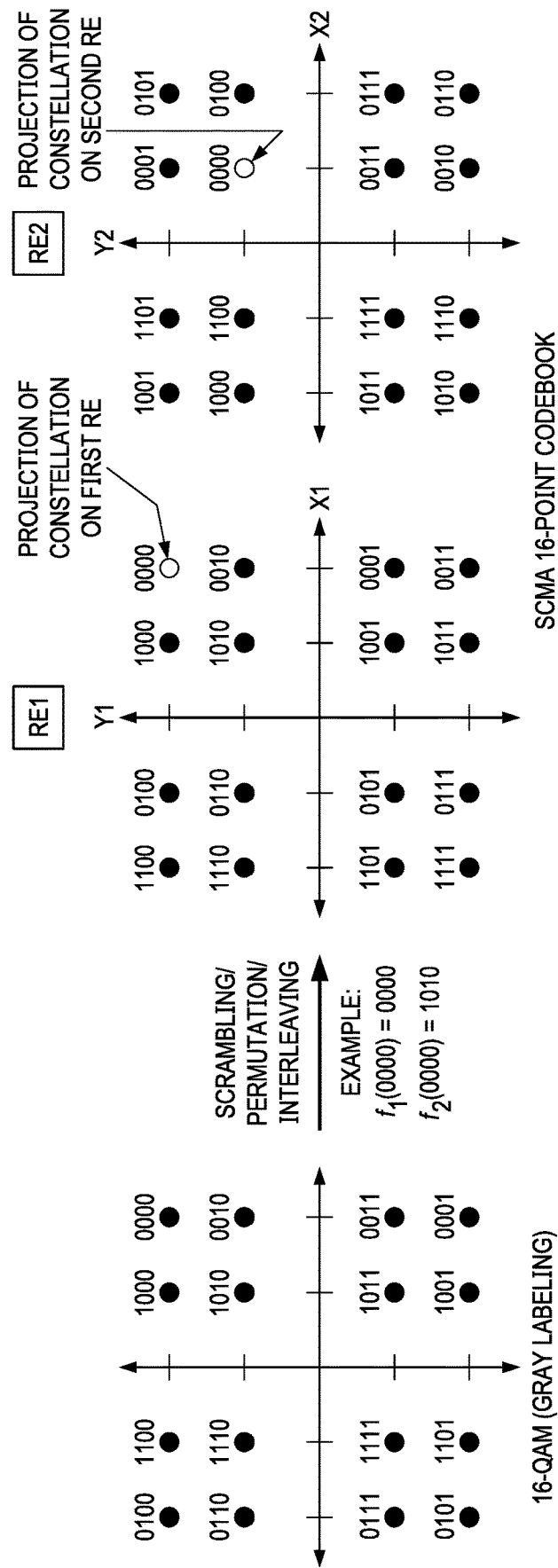
FIG. 18 is a diagram of how bit-level scrambling, permutation, and interleaving may be used to implement the 16-point SCMA codebook using a standard 16-QAM modulator employing Gray labelling, according to some embodiments.

FIGS. 17 and 18 illustrate an example bit-level operation for constellation relabeling according to the embodiment of FIG. 16B. FIG. 17 shows the constellation diagrams of two successive REs used in a 16-point SCMA codebook. FIG. 18 shows how bit-level scrambling, permutation, and interleaving may be used to implement the 16-point SCMA codebook using a standard 16-QAM modulator employing Gray labelling.

Figure 19:
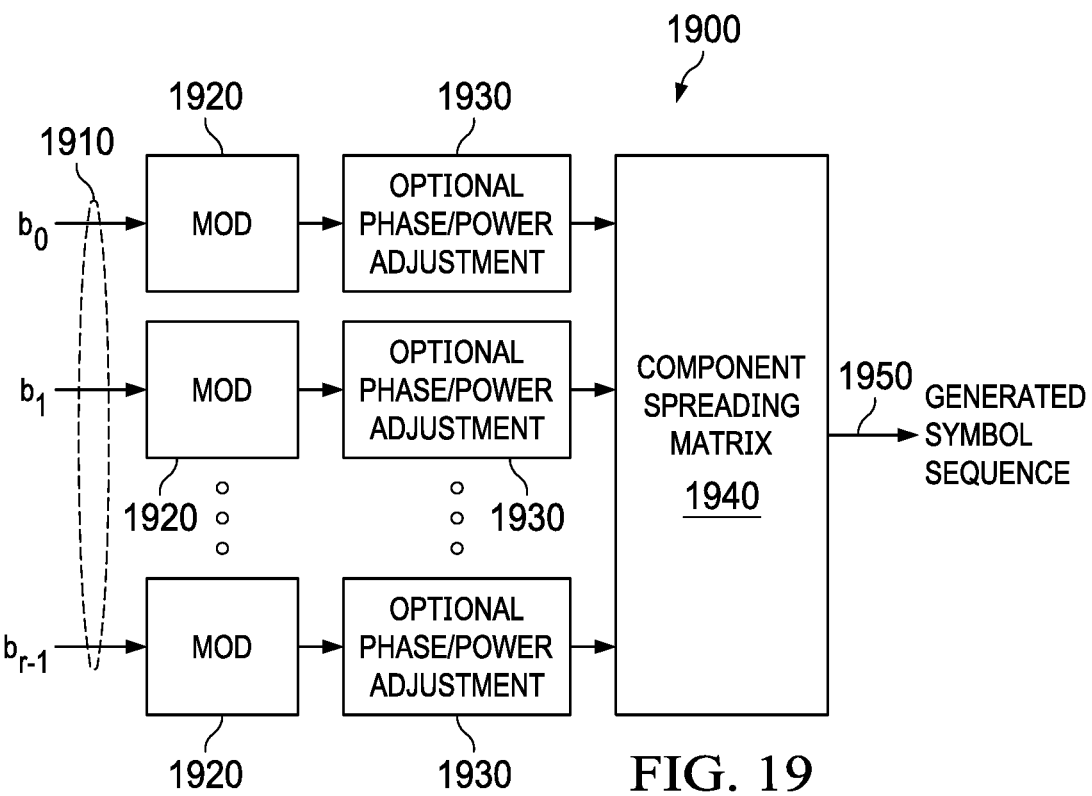
FIG. 19 is a diagram of symbol sequence generation by a component spreading matrix, according to some embodiments.

FIG. 19 illustrates a general example of a non-linear spreading multiple access method based on linear operations defined at least by a component spreading matrix, according to an embodiment of the present disclosure. In FIG. 19, bits 1910 are input into modulators 1920, where the bits 1910 are modulated according to: $d = [d_0 \, d_1 \, \ldots \, d_L]^T$.

Optional phase/power adjustments components 1930 may be used to separate the real and imaginary components of the modulated symbols. A component spreading matrix 1940 generates an output symbol sequence 1950 based on the symbol sequences generated by each modulator 1920. An example of the component spreading matrix 1940 is $W_p \in \mathbb{C}^{k \times L}$, i.e., $W_p d$, where k is the number of non-zero components.

Figure 20A:
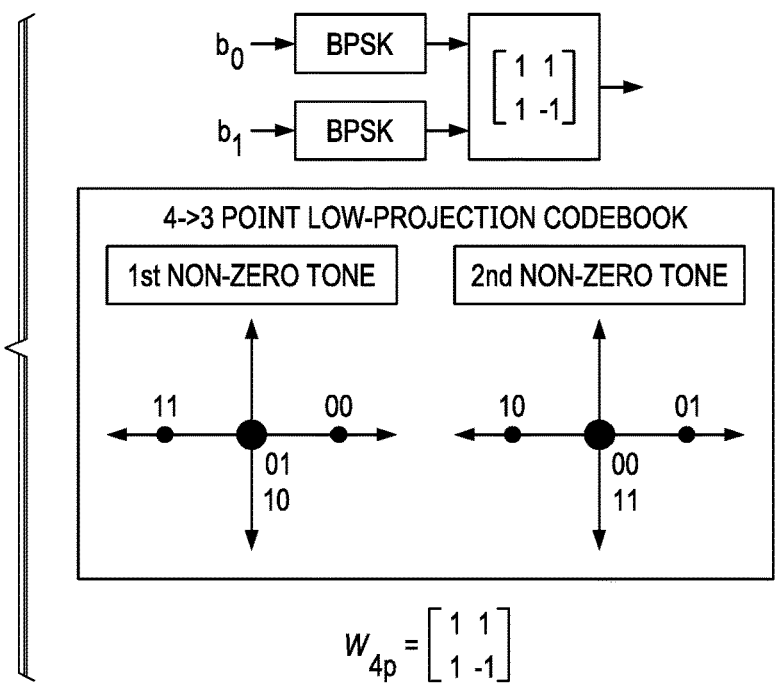
FIG. 20A is a diagram of an example SCMA 4-point codebook, according to some embodiments.
Figure 20B:
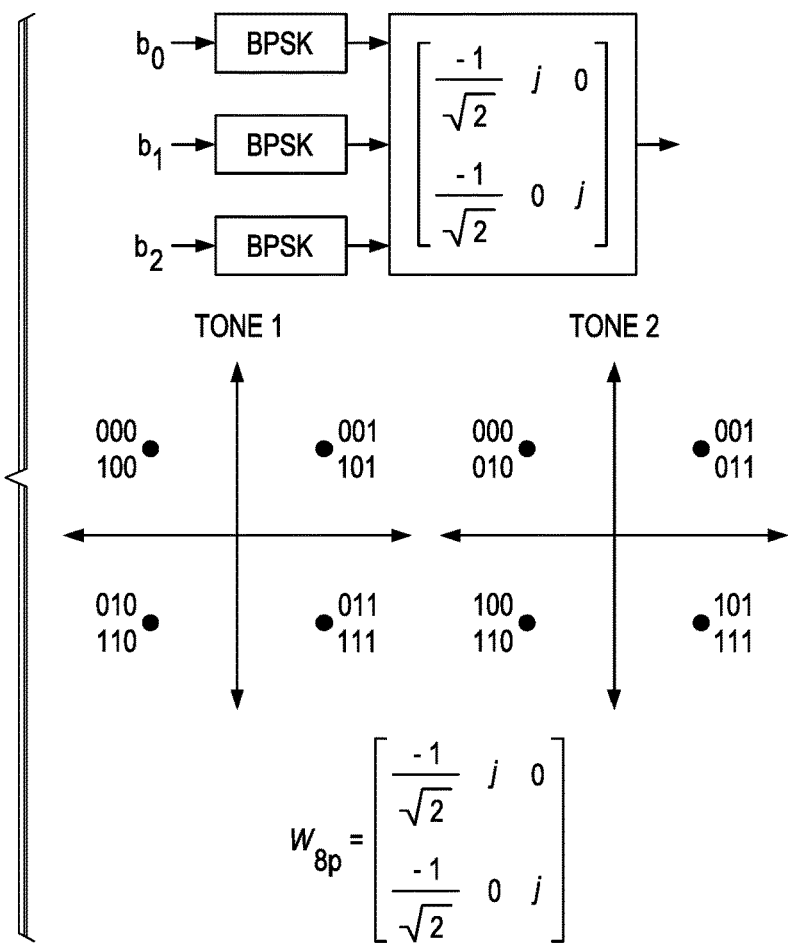
FIG. 20B is a diagram of an example SCMA 8-point codebook, according to some embodiments.

More specifically, FIG. 20A illustrates the generation of an example SCMA 4-point codebook by a component spreading matrix. FIG. 20B illustrates the generation of an example SCMA 8-point codebook by a component spreading matrix.

The SCMA codebooks of FIGS. 20A and 20B are generated using binary phase shift keying (BPSK) and/or $$\frac{\pi}{2} - BPSK.$$

However, it is also desirable to implement non-orthogonal multiple access systems, both linear and non-linear using other orders and methods of modulation. Embodiments of the present disclosure provide for non-orthogonal multiple access based on various modulation schemes, such as quadrature phase shift keying (QPSK)/4-QAM, 8-QAM, 16-QAM, 64-QAM, and 256-QAM.

Figure 21:
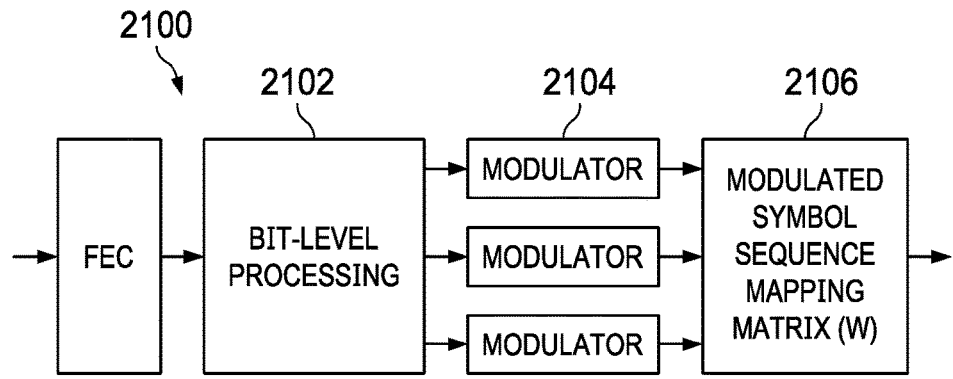
FIG. 21 is a diagram of a transmitter configured to generate data symbols for transmission on a communication channel, according to some embodiments.

FIG. 21 illustrates another embodiment of the present disclosure wherein a spreading matrix and a RE mapper of a transmitter are combined. In the embodiment of FIG. 21, the transmitter 2100 comprises bit-level processor 2102 and at least one modulator 2104. While three modulators 2104 are shown in FIG. 21, the transmitter 2100 may be configured to have one, two, four, or more modulators 2104.

The bit-level processor 2102 performs some bit-level operation, such as interleaving or scrambling to generate at least one bit sequence for modulation. The at least one modulator 2104 generates a first symbol sequence from the at least one bit sequence. The transmitter 2100 may optionally obtain its input bits from a FEC encoder.

The transmitter 2100 further comprises a modulated symbol sequence mapping matrix, W, block 2106 for generating a second symbol sequence from the first symbol sequence and mapping each symbol of the second symbol sequence to a resource element of the communication channel.

Once the transmitter 2100 has generated and mapped symbols to REs, the transmitter 2100 may transmit the symbols on physical resources of the communication channel according to each mapped resource element.

In this embodiment, the modulated symbol sequence of length L (denoted by d), to be transmitted over an N number of resource elements, are mapped to these resource elements by a linear mapping matrix $W \in \mathbb{C}^{N \times L}$, i.e., $x = Wd$. Accordingly, embodiments of signature generation based on component spreading matrix are a special case of the embodiment of FIG. 21.

Furthermore, the embodiment of FIG. 21 can be used to implement a variety of other non-orthogonal multiple access schemes. The size N can be several REs (greater than or equal to 1), several resource blocks (RBs) (greater than or equal to 1) or the entire bandwidth of the transmission. As examples, for a particular SCMA codebook, W is a block diagonal matrix and the diagonal blocks/sub-matrices can be $PW_{sp}$ where $P \in \mathbb{C}^{N \times L}$ is a sparse permutation/identity matrix and $W_{sp} \in \mathbb{C}^{4 \times 3}$ is the component spreading matrix of 8-point codebook. More generally, W is a block diagonal matrix and the diagonal blocks/sub-matrices can be PS where $P \in \mathbb{C}^{N \times L}$ is a sparse permutation/identity matrix and S is a spreading matrix. Some examples of component spreading matrix are shown in FIGS. 20A and 20B for 4-point and 8-point codebooks, respectively.

For multi-user shared access (MUSA) or pattern division multiple access (PDMA), W is a block diagonal matrix and diagonal blocks are N×1 vector (spreading sequence). For IDMA, W=I (the identity matrix). For IGMA, W is a sparse permutation matrix. In a special case, W is sparse identity matrix in which some of the diagonal elements are zero.

Figure 22:
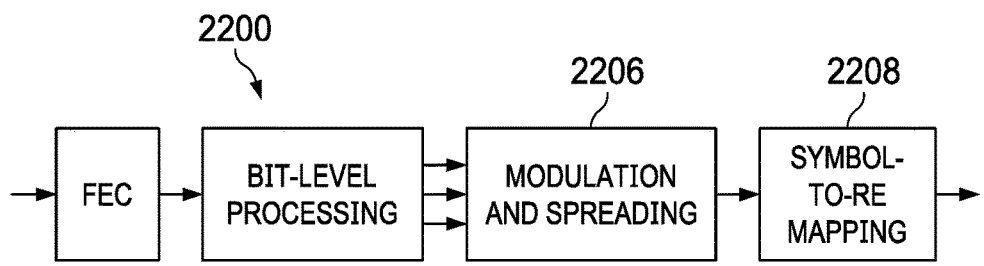
FIG. 22 is a diagram of a transmitter configured to generate data symbols for transmission on a communication channel, according to other embodiments.

FIG. 22 illustrates another embodiment of the present disclosure wherein a modulator and a spreading matrix are combined. In the embodiment of FIG. 22, a transmitter 2200 obtains a bit sequence, which may optionally be obtained from a FEC encoder, in which case obtained bit sequence is a FEC encoded binary bit sequence.

The transmitter 2200 comprises a modulation and spreading matrix, S, 2206, for generating a symbol sequence based on the bit sequence in accordance with the matrix S. The relation between the output symbol sequence x to the input bits stream can be explained as $x = S(1-2b)$. The modulation and spreading matrix S may be a component spreading matrix. The transmitter 2200 further comprises a RE mapper 2208 for mapping each symbol of the symbol sequence to a resource element of the communication channel.

Once the transmitter 2200 has generated and mapped symbols to REs, the transmitter 2200 may transmit the symbols on physical resources of the communication channel according to each mapped resource element.

For SCMA, the modulation and spreading matrix is equal to the component spreading matrix for each corresponding codebook. For example, for SCMA 8-point rectangular codebook we have for $$S = \begin{bmatrix} -\frac{1}{\sqrt{2}} & j & 0 \\ -\frac{1}{\sqrt{2}} & 0 & j \end{bmatrix},$$

for SCMA 8-point square codebook $$S = \begin{bmatrix} -1 & j & 0 \\ -1 & 0 & j \end{bmatrix},$$

for SCMA 4-point codebook we have $$S = \begin{bmatrix} 1 & 1 \\ 1 & -1 \end{bmatrix},$$

for SCMA 16-point 9-projection codebook $$S = \begin{bmatrix} j & j & 1 & 1 \\ -j & j & -1 & 1 \end{bmatrix}$$

and for 16-point 16-projection codebook S can be obtained as $$S = \frac{1}{\sqrt{10}} \begin{bmatrix} 2j & j & 2 & 1 \\ -j & 2j & -1 & 2 \end{bmatrix}.$$

Further, linear spreading can be captured in S as a K×2 matrix obtained as V.[1 j], where V denotes the spreading signature of length K and K denotes a spreading factor.

In some embodiments, some rules can be specified for generating/selecting/determining the modulation and spreading S in order to guarantee a certain performance. In some embodiments, the rules may include avoiding complex elements in the matrices. This means for example that the individual elements in each column of the matrices have either a pure real component or a pure imaginary component. In some other embodiments, the elements of the matrices can be restricted to be in a given set, e.g. {0,1,−1, j,−j}. Furthermore, the rules may impose that any given two columns of the matrices should be orthogonal to each other in both the real and imaginary domains. In other words, each column contains two component vectors, i.e. a real component vector and an imaginary component vector. These real and imaginary component vectors can be obtained by considering only the real parts of each element of a given column in the real component vector and only the imaginary parts of each element of the given column in the imaginary component vector. Therefore, this rule implies that, both their real component vectors and imaginary component vectors should be orthogonal to each other. The real component vectors of two columns are orthogonal if the inner product of the real component vectors is equal to zero. Similarly, the imaginary component vectors of two columns are orthogonal if the inner product of the imaginary component vectors is equal to zero. In some embodiments, another rule may include that the sum of the powers of the elements of each of the columns should be equal for all of the columns in the matrix.

In some embodiments, the relation between the output symbol sequence x and the input bit stream b can be specified as x=f(s,b), wherein s is the MA signature (e.g. spreading signature). For example for linear spreading and 16 QAM modulation we can have $$x = \frac{v}{\sqrt{10}}$$
$$((1 - 2b(i))(2 - (1 - 2b(i + 2))) + j(1 - 2b(i + 1))(2 - (1 - 2b(i + 3)))),$$

where v denotes the spreading sequence. This way, the output symbol sequence is presented bypassing the spreading matrix. In other words, the output symbol sequence is presented based on the input bit sequence using a formula which contains spreading sequence and this spreading sequence can be obtained based on a LUT.

According to the embodiments of FIG. 22, a modulated symbol sequence is generated in one step, with or without spreading. Therefore, the embodiments of FIG. 22 may be used to implement all QPSK modulation-based non-orthogonal multiple access schemes. For higher order modulation, this method can be used in conjunction with relabeling which can be realized by bit-level operations such as those performed by a bit-level processing block.

Figure 23A:
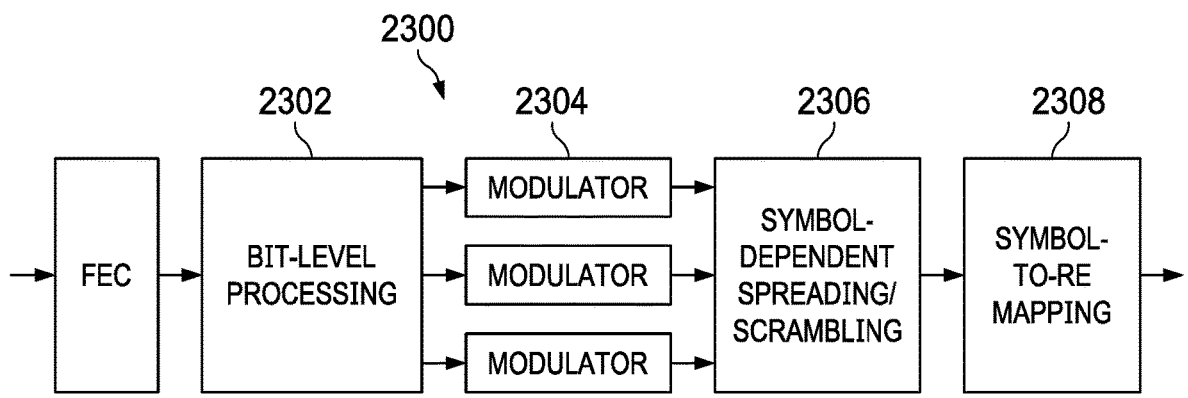
FIG. 23A is a diagram of a transmitter configured to generate data symbols for transmission on a communication channel, according to other embodiments.

FIG. 23A is a schematic diagram of a multiple access communication system according to an embodiment of the present disclosure. In the example of FIG. 23A, a transmitter 2300 obtains a first bit sequence, which may optionally be obtained from a FEC encoder, in which case obtained bit sequence is a FEC encoded binary bit sequence. The transmitter 2300 comprises a bit-level processor 2302 for generating at least a second bit sequence and a third bit sequence from the first bit sequence. In the example of FIG. 23A, the bit-level processor 2302 additionally generates a fourth bit sequence.

The transmitter further comprises a modulator 2304 for modulating at least the second bit sequence and the third bit sequence to generate, respectively, at least a first symbol sequence and second symbol sequence.

The modulator 2304 may be implemented by using multiple instances of a single modulator, where each single modulator has one input for receiving a bit sequence and one output for providing a symbol sequence. Alternatively, the modulator 2304 may be implemented as a one or more aggregate entities each comprising parallel inputs for receiving separate bit sequences, parallel outputs for providing separate symbol sequences, and separate parallel internal processes for modulating bit sequences to generate symbols.

The transmitter also comprises a symbol-dependent spreading/scrambling block 2306. The symbol-dependent spreading/scrambling block 2306 receives modulated symbol sequences (e.g., at least a first symbol sequence and second symbol sequence) from the modulator 2304 and spreads/scrambles each modulated symbol of each sequence according to a plurality of symbol-dependent spreading/scrambling sequences. The symbol-dependent spreading/ scrambling block 2306 generates spread symbol sequences from the modulated symbol sequences.

The plurality of symbol-dependent spreading/scrambling sequences comprise individual sequences, where each individual sequence depends on the actual modulated symbol to be spread/scrambled.

In an embodiment of the present disclosure based on symbol-dependent spreading, the output of the symbol-dependent spreading/scrambling block 2306 can be represented by the function $Y=S(x)\cdot x$, where x is the input-modulated symbol and $S(x)$ is the spreading sequence which depends on x.

In an embodiment of the present disclosure based on symbol-dependent scrambling, the output sequence of the symbol-dependent spreading/scrambling block 2306 can be represented by the function $Y=S(x)\cdot^{*}x$, where x is the sequence of input-modulated symbols, $S(x)$ denotes the scrambling sequence which depends on the input sequence of modulated symbols and "·*" denotes an element-by-element multiplication operation. The transmitter 2300 further comprises a RE mapper 2308 for mapping each symbol of the symbol sequence to a resource element of the communication channel. Once the transmitter 2300 has generated and mapped symbols to REs, the transmitter 2300 may transmit the symbols on physical resources of the communication channel according to each mapped resource element.

Figure 23C:
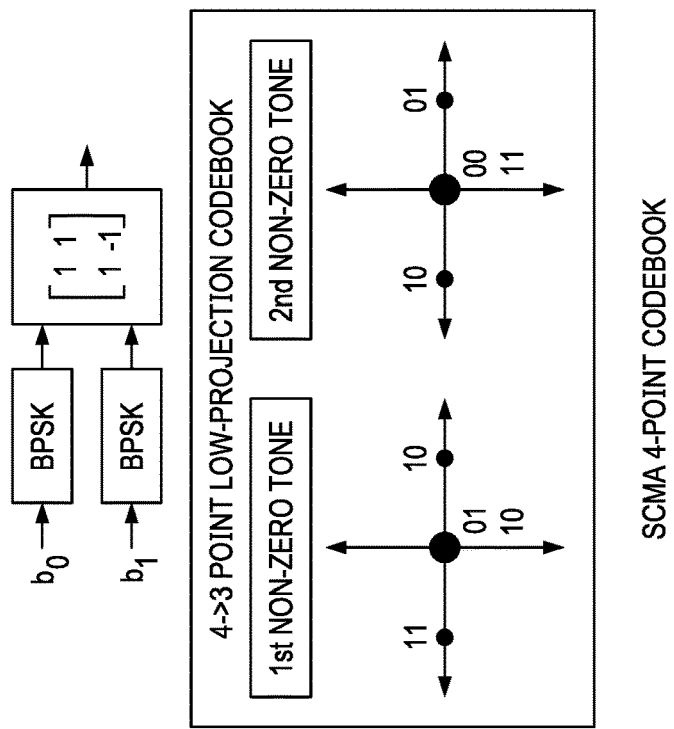
FIG. 23C is a diagram showing an example of the 4-point SCMA codebook generated by the symbol-dependent spreading of the embodiment of FIG. 23B, according to some embodiments.
Figure 23B:
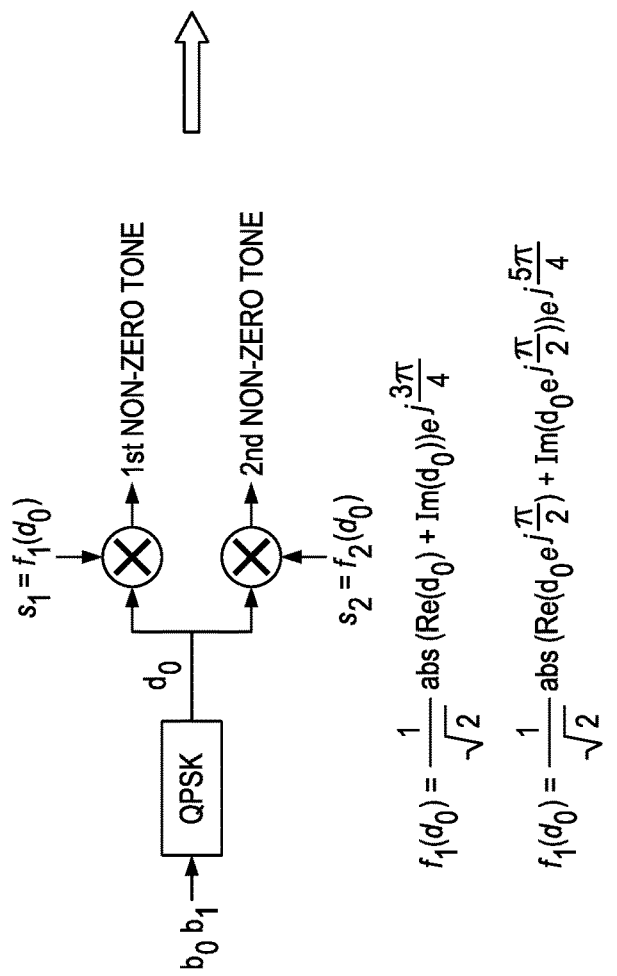
FIG. 23B is a diagram in which a 4-point SCMA codebook is generated by symbol-dependent spreading, according to some embodiments.

FIG. 23B illustrates yet another embodiment of the present disclosure in which a 4-point SCMA codebook is generated by symbol-dependent spreading. In this example, each QPSK symbol is spread by a complex spreading sequence of length 2 and the spreading sequence depends on the QPSK symbol through the following equation:

$$f_1(d_0) = \frac{1}{\sqrt{2}} \text{abs}(\text{Re}(d_0) + \text{Im}(d_0)) e^{j\frac{3\pi}{4}}$$

$$f_1(d_0) = \frac{1}{\sqrt{2}} \text{abs}\left(\text{Re}\left(d_0 e^{j\frac{\pi}{2}}\right) + \text{Im}\left(d_0 e^{j\frac{\pi}{2}}\right)\right) e^{j\frac{5\pi}{4}}$$

FIG. 23C shows an example of the 4-point SCMA codebook generated by the symbol-dependent spreading of the embodiment of FIG. 23B.

Figure 23D:
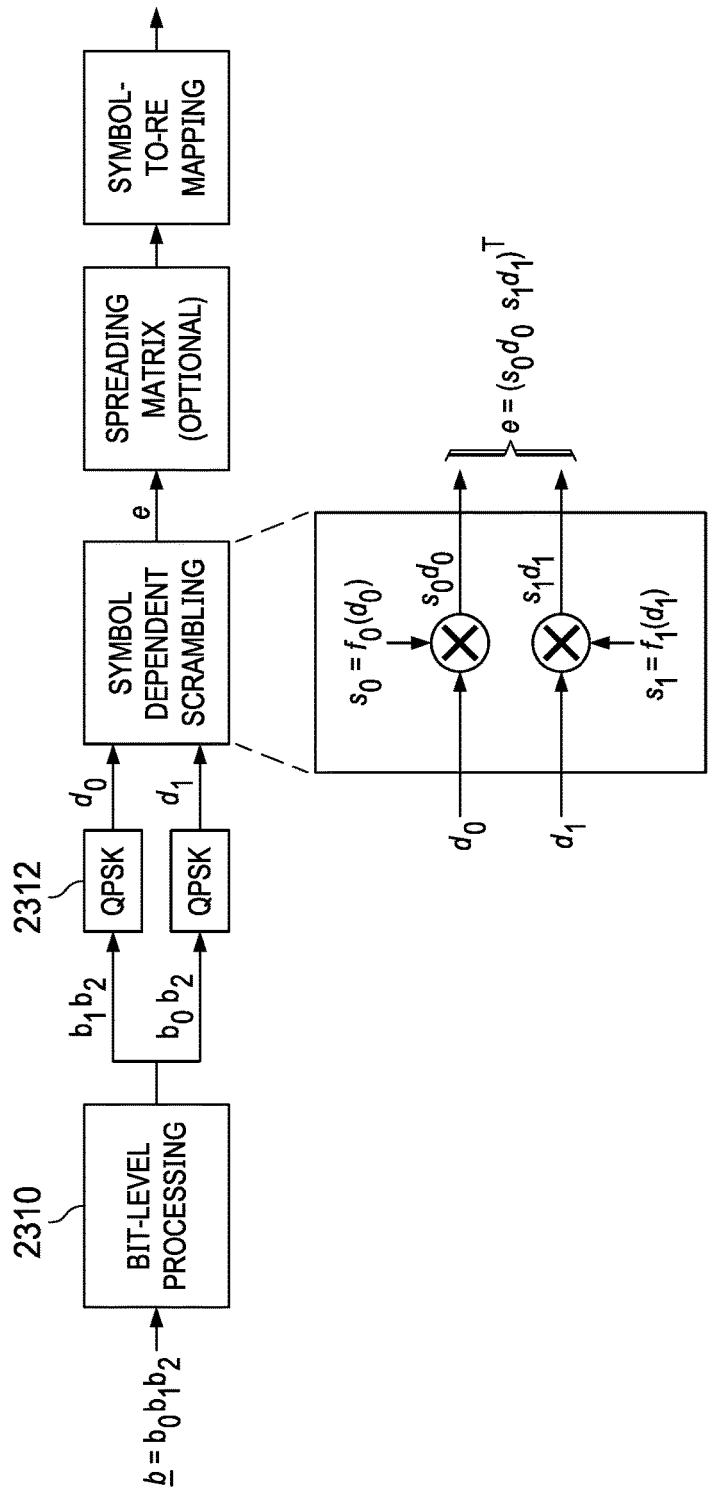
FIG. 23D is a diagram showing an 8-point SCMA codebook being generated by symbol-level scrambling, according to some embodiments.

FIG. 23D illustrates yet another embodiment of the present disclosure in which an 8-point SCMA codebook is generated by symbol-level scrambling. The bit-level processor 2310 maps the input bit sequence $b_0 b_1 b_2$, to two output sequences $b_1 b_2$ and $b_0 b_2$ as shown where the bit sequences are overlapping in one bit: $b_2$. The two bit sequences $b_1 b_2$ and $b_0 b_2$ are modulated by QPSK modulators 2312 to generate QPSK symbols $d_0$ and $d_1$. The QPSK symbols $d_0$ and $d_1$ are multiplied by complex coefficients $f_0$ and $f_1$, which depend on the input symbols $d_0$ and $d_1$ through a specified equation. The symbols of the output symbol sequence, e, may be mapped to the corresponding resource elements by symbol-to-RE mapping.

In accordance with an embodiment of the present disclosure, a method for multiple access communication on a communication channel includes obtaining a first bit sequence; generating at least two further bit sequences from the first bit sequence; modulating each of the at least two further bit sequences to generate at least two symbol sequences; spreading each of the at least two symbol sequences to generate a spread symbol sequence; mapping each symbol of the spread symbol sequence to a RE of the communication channel; and transmitting each of the symbols on physical resources of the communication channel according to each mapped resource element.

In the previous embodiment, mapping comprises mapping each symbol of the spread symbol sequence to a resource element of the communication channel according to a symbol-to-RE mapping rule. In any of the previous embodiments, the symbol-to-RE mapping rule is a sparse mapping. In any of the previous embodiments, the symbol-to-RE mapping rule is a non-sparse mapping. In any of the previous embodiments, the first bit sequence is a sequence of binary FEC encoded bits. In any of the previous embodiments, generating the at least two further bit sequences comprises: repeating at least a subset of the first bit sequence to generate a second bit sequence; interleaving the second bit sequence to generate a third bit sequence; and mapping each bit of the third bit sequence to each of the at least two further bit sequences. In any of the previous embodiments, the method further comprises scrambling of the third bit sequence. In any of the previous embodiments, the at least two further bit sequences are equal. In any of the previous embodiments, modulating each of the at least two further bit sequences comprises QPSK modulation. In any of the previous embodiments, modulating each of the at least two further bit sequences comprises QAM. In any of the previous embodiments, spreading each of the at least two symbol sequences comprises generating a spread symbol sequence in accordance with a spreading matrix.

In accordance with another embodiment of the present disclosure, a method for multiple access communication on a communication channel includes obtaining a first symbol sequence; generating a second symbol sequence from the first symbol sequence in accordance with a mapping matrix W, where each symbol of the second symbol sequence is mapped to a RE of the communication channel in accordance with the mapping matrix W; and transmitting the second symbol sequence on physical resources of the communication channel according to each mapped resource element.

In the previous embodiment, the mapping matrix W is a block diagonal matrix. In any of the previous embodiments, the mapping matrix W is equal to P·S, where P is a sparse permutation matrix and S is a spreading matrix. In any of the previous embodiments, the mapping matrix W is an identity matrix. In any of the previous embodiments, the mapping matrix W is a sparse permutation matrix.

In accordance with another embodiment of the present disclosure, a method for multiple access communication on a communication channel includes obtaining a bit sequence; generating a symbol sequence based on the bit sequence, in accordance with a modulation and spreading matrix S; mapping each symbol of the symbol sequence to a resource element (RE) of the communication channel; and transmitting the symbol sequence on physical resources of the communication channel according to each mapped resource element.

In the previous embodiment, generating the symbol sequence is based on the equation $x=S\cdot(1-2b)$, where x is the generated symbol sequence and b is the obtained bit sequence. In any of the previous embodiments, the modulation and spreading matrix S is a K×2 matrix obtained from the equation $S=v\cdot[1\ j]$, where v is a spreading vector of length K. In any of the previous embodiments, the spreading matrix S is a component spreading matrix.

In accordance with another embodiment of the present disclosure, a method for multiple access communication on a communication channel includes obtaining a first bit sequence; generating a second bit sequence and a third bit sequence from the first bit sequence; modulating each second bit sequence and third bit sequence to generate, respectively, a first symbol sequence and a second symbol sequence; spreading the first symbol sequence to generate a third symbol sequence based on a plurality of symbol-dependent spreading sequences, wherein each symbol of the first symbol sequence is associated with a symbol-dependent spreading sequence from the plurality of symbol-dependent spreading sequences; spreading the second symbol sequence to generate a fourth symbol sequence based on the plurality of symbol-dependent spreading sequences, wherein each symbol of the second symbol sequence is associated with a symbol-dependent spreading sequence from the plurality of symbol-dependent spreading sequences; mapping each symbol of the third symbol sequence and the fourth symbol sequence to a RE of the communication channel; and transmitting each of the symbols on physical resources of the communication channel according to each mapped resource element.

In the previous embodiment, the plurality of symbol-dependent spreading sequences comprises a plurality of symbol-dependent scrambling sequences, and the method further comprises: spreading the first symbol sequence to generate a third symbol sequence based on the plurality of symbol-dependent scrambling sequences, wherein each symbol of the first symbol sequence is associated with a symbol-dependent scrambling sequence from the plurality of symbol-dependent scrambling sequences; and spreading the second symbol sequence to generate a fourth symbol sequence based on the plurality of symbol-dependent scrambling sequences, wherein each symbol of the second symbol sequence is associated with a symbol-dependent scrambling sequence from the plurality of symbol-dependent scrambling sequences.

In accordance with another embodiment of the present disclosure, a method for multiple access communication over a communication channel includes obtaining a bit sequence, selecting a first MA signature comprising a configuration for at least one first transmission operation, transmitting a first symbol sequence generated from the obtained bit sequence, performing the at least one first transmission operation based on the selected first MA signature, selecting a second MA signature, which is different than the first MA signature and includes a configuration for at least one second transmission operation, transmitting a second symbol sequence generated from the obtained bit sequence, and performing the at least one transmission operation based on the selected second MA signature. In one example, the first and/or second transmission operations may include a bit processing operation, a spreading operation, a mapping operation, a scrambling operation, or combinations thereof. In the same example, or another example, the first and second MA signatures may be selected in accordance with a UE ID and/or configured in advance by the network using higher layer signaling. In any of the In preceding examples, or in another example, the the first and second MA signatures are selected based on at least one of: cell coverage, UE density, complexity, throughput, spectral efficiency, a reliability requirement for a UE, and a transmission requirement of a UE. In any of the preceding examples, or in another example, the first and second MA signatures are explicitly signaled to a receiver. Alternatively, the first and second MA signatures may be determined by the receiver using blind detection. In any of the preceding examples, or in another example, the first and second MA signatures are implicitly determined at the receiver based on physical parameters of a modulation and coding scheme.

Figure 24:
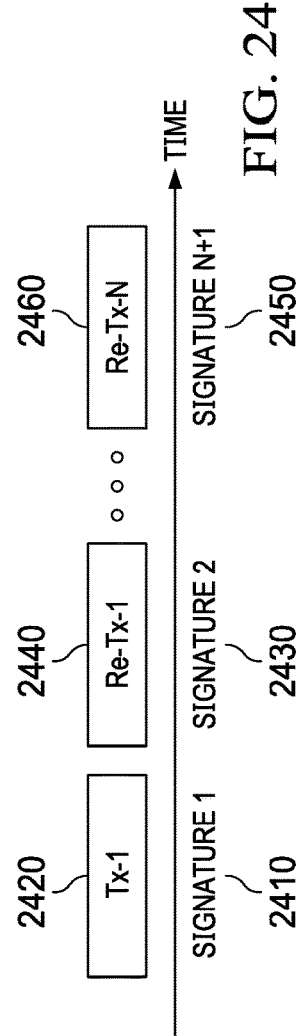
FIG. 24 is a diagram of the use of different multiple access signatures in an original transmission and subsequent retransmissions, according to some embodiments.

FIG. 24 illustrates an embodiment wherein a first multiple access (MA) signature 2410 is used for a first transmission 2420, a second MA signature 2430 is used for a first retransmission 2440 of the first transmission 2420, and a third MA signature 2450 is used for a subsequent retransmission 2460 of the first transmission 2420.

In an embodiment, a method comprises obtaining a bit sequence and selecting a first MA comprising a configuration for at least one transmission operation. After performing the at least one transmission operation based on the selected first MA signature and transmitting a first symbol sequence generated from the obtained bit sequence, the method comprises selecting a second MA signature different from the first MA signature. The method next performs the at least one transmission operation based on the selected second MA signature and performs a retransmission of the obtained bit sequence by transmitting a second symbol sequence.

In further embodiments, the MA signature may be defined based on a configuration for at least one transmission operation, including a bit-processing operation (including bit interleaving, bit scrambling, etc.), a spreading operation (including spreading sequence, spreading matrix, or modulation and spreading matrix), a mapping operation (including symbol-to-RE mapping or modulated symbol sequence mapping matrix) or a symbol-level scrambling operation. MA signatures defined for multiple transmissions (initial transmission and retransmissions) based on a pattern in accordance with a user equipment (UE) identification (ID) and can be configured in advance by a network and communicated to the UE using higher layer signaling, such as radio resource control (RRC) signaling.

The embodiments described above use various methods to model and implement the building blocks of a non-orthogonal multiple access transmission scheme. At least a portion such a scheme might be modeled by a MA signature including but not limited to a spreading matrix, a modulation and spreading matrix, and/or a mapping matrix. In an embodiment, one or more of such MA signatures is selected based on cell coverage, UE density, receiver complexity, throughput, spectral efficiency, and/or a reliability requirement for a UE. In an embodiment, the network can configure a list of such MA signatures to be used for UE transmission. Based on one or more of the above parameters, the UE selects an appropriate MA signature from the list for data transmission. In some embodiments, the choice of the MA signature to be used by the UE can be signaled explicitly to the UE. In other embodiments, this information can be obtained by blind detection at the receiver or obtained implicitly from physical parameters such as the modulation and coding scheme (MCS).

The embodiments disclosed herein provide several options to incorporate all proposed non-orthogonal multiple access schemes under a unified implementation-friendly framework.

Figure 25:
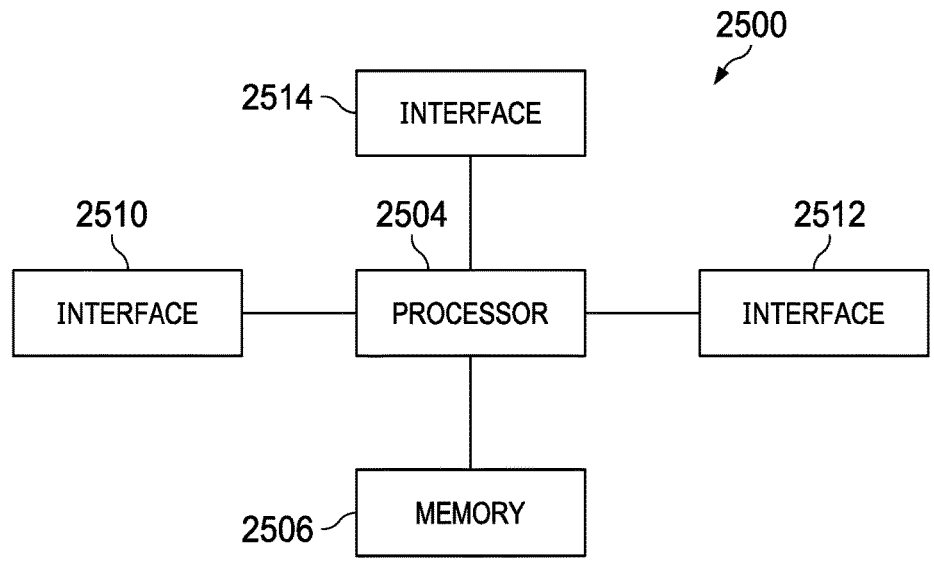
FIG. 25 is a block diagram of an embodiment processing system for performing methods described herein.

FIG. 25 illustrates a block diagram of an embodiment processing system 2500 for performing methods described herein, which may be installed in a host device. As shown, the processing system 2500 includes a processor 2504, a memory 2506, and interfaces 2510-2514. The processor 2504 may be any component or collection of components adapted to perform computations and/or other processing related tasks, and the memory 2506 may be any component or collection of components adapted to store programming and/or instructions for execution by the processor 2504. A means for configuring a context for a UE may include processor 2504. In an embodiment, the memory 2506 includes a non-transitory computer readable medium. The interfaces 2510, 2512, 2514 may be any component or collection of components that allow the processing system 2500 to communicate with other devices/components and/or a user. For example, one or more of the interfaces 2510, 2512, 2514 may be adapted to communicate data, control, or management messages from the processor 2504 to applications installed on the host device and/or a remote device. As another example, one or more of the interfaces 2510, 2512, 2514 may be adapted to allow a user or user device (e.g., personal computer (PC), etc.) to interact/communicate with the processing system 2500. The processing system 2500 may include additional components not depicted in FIG. 25, such as long term storage (e.g., non-volatile memory, etc.).

In some embodiments, the processing system 2500 is included in a network device that is accessing, or part otherwise of, a telecommunications network. In one example, the processing system 2500 is in a network-side device in a wireless or wireline telecommunications network, such as a base station, a relay station, a scheduler, a controller, a gateway, a router, an applications server, or any other device in the telecommunications network. In other embodiments, the processing system 2500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 26:
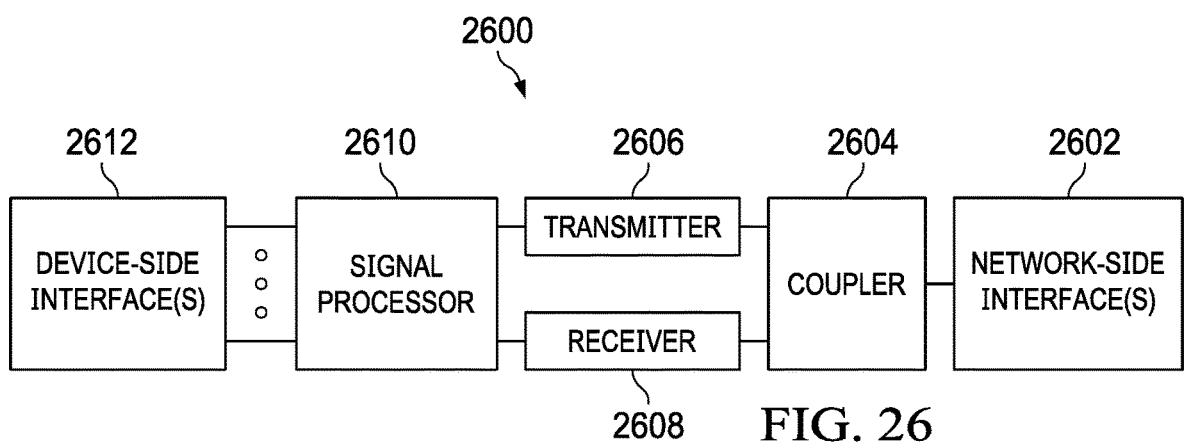
FIG. 26 is a block diagram of a transceiver adapted to transmit and receive signaling over a telecommunications network according to example embodiments described herein.

In some embodiments, one or more of the interfaces 2510, 2512, 2514 connects the processing system 2500 to a transceiver adapted to transmit and receive signaling over the telecommunications network. FIG. 26 illustrates a block diagram of a transceiver 2600 adapted to transmit and receive signaling over a telecommunications network. The transceiver 2600 may be installed in a host device. As shown, the transceiver 2600 comprises a network-side interface 2602, a coupler 2604, a transmitter 2606, a receiver 2608, a signal processor 2610, and a device-side interface 2612. The network-side interface 2602 may include any component or collection of components adapted to transmit or receive signaling over a wireless or wireline telecommunications network. The network-side interface 2602 may also include any component or collection of components adapted to transmit or receive signaling over a short-range interface. The network-side interface 2602 may also include any component or collection of components adapted to transmit or receive signaling over a Uu interface. The coupler 2604 may include any component or collection of components adapted to facilitate bi-directional communication over the network-side interface 2602. The transmitter 2606 may include any component or collection of components (e.g., up-converter, power amplifier, etc.) adapted to convert a baseband signal into a modulated carrier signal suitable for transmission over the network-side interface 2602. A means for transmitting an initial message of an access procedure may include transmitter 2606. The receiver 2608 may include any component or collection of components (e.g., down-converter, low noise amplifier, etc.) adapted to convert a carrier signal received over the network-side interface 2602 into a baseband signal. A means for receiving mobile subscriber identifiers, initial downlink messages of access procedures, and forwarded requests to connect to a network may include receiver 2608.

The signal processor 2610 may include any component or collection of components adapted to convert a baseband signal into a data signal suitable for communication over the device-side interface(s) 2612, or vice-versa. The device-side interface(s) 2612 may include any component or collection of components adapted to communicate data-signals between the signal processor 2610 and components within the host device (e.g., the processing system 2500, local area network (LAN) ports, etc.).

The transceiver 2600 may transmit and receive signaling over any type of communications medium. In some embodiments, the transceiver 2600 transmits and receives signaling over a wireless medium. For example, the transceiver 2600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

In such embodiments, the network-side interface 2602 comprises one or more antenna/radiating elements. For example, the network-side interface 2602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for using a standard modulator to enable non-orthogonal multiple access (NoMA) communication, the method comprising:

generating, by a transmitter, an output bit-stream from an input bit-stream to emulate a symbol-domain operation associated with a multiple access signature without error-detection/correction in a bit domain, wherein such that a length of the output bit-stream is greater than a length of the input bit-stream, the input bit-stream being an error-detection/correction encoded bit-stream;

modulating, by the transmitter, the output bit-stream in accordance with the standard modulator to obtain a sequence of symbols, wherein a value of at least one bit of the input bit-stream is associated with at least two symbols of the sequence of symbols, and wherein the standard modulator is one of Quadrature Amplitude Modulation (QAM) modulator, a Binary $$\frac{\pi}{2} - BPSK$$

Phase Shift Keying (BPSK) modulator, modulator, and a Quadrature Phase Shift Keying (QPSK) modulator;

mapping, by the transmitter, the sequence of symbols to resource elements to obtain a NoMA signal; and transmitting the NoMA signal to a receiver.

2. The method of claim 1, wherein the sequence of symbols comprises a plurality of different subsets of symbols, and at least two subsets are associated with different bits in the input bit-stream.

3. The method of claim 1, wherein the sequence of symbols comprises a plurality of different subsets of symbols, and a relationship between one or both of a phase and an amplitude of symbols in a subset of the plurality depends on the input bit-stream, the relationship between the one or both of the phase and the amplitude of symbols in the subset of the plurality being at least one of:

a relationship between phases of symbols in the subset of the plurality;

a relationship between amplitudes of symbols in the subset of the plurality;

a relationship between a phase and an amplitude of a same symbol in the subset of the plurality; or a relationship between a phase of a first symbol in the subset of the plurality and an amplitude of a second symbol in the subset of the plurality.

4. The method of claim 1, wherein generating the output bit-stream from the input bit-stream includes applying bit-domain linear spreading to the input bit-stream.

5. The method of claim 1, further comprising encoding, by a forward error correction (FEC) encoder, an unmodified input bit-stream to generate the error-detection/correction encoded input bit-stream.

6. The method of claim 1, wherein the receiver is a user equipment (UE), and wherein the method further comprises transmitting an indication of a multiple access (MA) signature to the UE, the MA signature configuring the UE to distinguish the UE's uplink transmission from other UEs' uplink transmissions.

7. The method of claim 1, wherein the receiver is a user equipment (UE), and wherein the method further comprises transmitting an indication of a multiple access (MA) signature to the UE, the MA signature configuring the UE to to decode a downlink NoMA transmission.

8. The method of claim 1, further comprising:

selecting, by the transmitter, the multiple access signature in accordance with a radio node temporary identifier (RNTI).

9. The method of claim 1, further comprising:

selecting, by the transmitter, the multiple access signature in accordance with an index associated with a demodulation reference signal (DM-RS) pattern.

10. The method of claim 1, wherein the symbol-domain operation associated with the multiple access signature provides liner spreading in a symbol domain.

11. An apparatus comprising:

a processor; and a non-transitory computer readable storage medium storing programming for execution by the processor, the programming including instructions to:

generate an output bit-stream from an input bit-stream to emulate a symbol-domain operation associated with a multiple access signature without error-detection/correction in a bit-domain, wherein a length of the output bit-stream is greater than a length of the input bit-stream, the input bit-stream being an error-detection/correction encoded input bit-stream;

modulate the output bit-stream in accordance with a standard modulator to obtain a sequence of symbols, wherein a value of at least one bit of the input bit-stream is associated with at least two symbols of the sequence of symbols, and wherein the standard modulator is one of Quadrature Amplitude Modulation (QAM) modulator, a $$\frac{\pi}{2} - BPSK$$

Binary Phase Shift Keying (BPSK) modulator, a modulator, and a Quadrature Phase Shift Keying (QPSK) modulator;

map the sequence of symbols to resource elements to obtain a non-orthogonal multiple access (NoMA) signal; and transmit the NoMA signal to a receiver.

12. The apparatus of claim 11, wherein the sequence of symbols comprises a plurality of different subsets of symbols, and at least two subsets are associated with different bits in the input bit-stream.

13. The apparatus of claim 11, wherein the sequence of symbols comprises a plurality of different subsets of symbols, and a relationship between one or both of a phase and an amplitude of symbols in a subset of the plurality depends on the input bit-stream, the relationship between the one or both of the phase and the amplitude of symbols in the subset of the plurality being at least one of:

a relationship between phases of symbols in the subset of the plurality;

a relationship between amplitudes of symbols in the subset of the plurality;

a relationship between a phase and an amplitude of a same symbol in the subset of the plurality; or a relationship between a phase of a first symbol in the subset of the plurality and an amplitude of a second symbol in the subset of the plurality.

14. The apparatus of claim 11, wherein generating the output bit-stream from the input bit-stream includes applying bit-domain linear spreading to the input bit-stream.

15. The apparatus of claim 11, wherein the programming further includes instructions to encode an unmodified input bit-stream using a forward error correction (FEC) encoder to generate the error-detection/correction encoded input bit-stream.

16. The apparatus of claim 11, wherein different NoMA signals are transmitted to or by the same user equipment (UE).

17. The apparatus of claim 11, wherein different NoMA signals are transmitted to or by different user equipments (UEs).

18. The apparatus of claim 11, wherein the receiver is a user equipment (UE), and wherein the programming further includes instructions to transmit an indication of a multiple access (MA) signature to the UE, the MA signature configuring the UE to distinguish the UE's uplink transmission from other UEs' uplink transmissions.

19. The apparatus of claim 11, wherein the receiver is a user equipment (UE), and wherein the programming further includes instructions to transmit an indication of a multiple access (MA) signature to the UE, the MA signature configuring the UE to decode a downlink NoMA transmission.

20. The apparatus of claim 11, wherein the programming further includes instructions to:

select the multiple access signature in accordance with a radio node temporary identifier (RNTI).

21. The apparatus of claim 11, wherein the programming further includes instructions to:
 select the multiple access signature in accordance with an index associated with a demodulation reference signal (DM-RS) pattern.

22. The apparatus of claim 11, wherein the symbol-domain operation associated with the multiple access signature provides liner spreading in a symbol domain.

23. A computer program product comprising a non-transitory computer readable storage medium storing programming, the programming including instructions to:
 generate an output bit-stream from an input bit-stream to emulate a symbol-domain operation associated with a multiple access signature without error-detection/correction in a bit-domain, wherein a length of the output bit-stream is greater than a length of the input bit-stream, the input bit-stream being an error-detection/correction encoded bit-stream;
 modulate the output bit-stream in accordance with a standard modulator to obtain a sequence of symbols, wherein a value of at least one bit of the input bit-stream is associated with at least two symbols of the sequence of symbols, and wherein the standard modulator is one of Quadrature Amplitude Modulation (QAM) modulator, a $$\frac{\pi}{2} - BPSK$$

Binary Phase Shift Keying (BPSK) modulator, a modulator, and a Quadrature Phase Shift Keying (QPSK) modulator;
 map the sequence of symbols to resource elements to obtain a non-orthogonal multiple access (NoMA) signal; and
 transmit the NoMA signal to a receiver.

* * * * *

UNITED STATES PATENT AND TRADEMARK OFFICE
CERTIFICATE OF CORRECTION

PATENT NO. : 10,700,912 B2
APPLICATION NO. : 15/881408
DATED : June 30, 2020
INVENTOR(S) : Herath et al.

Page 1 of 1

It is certified that error appears in the above-identified patent and that said Letters Patent is hereby corrected as shown below:

In the Claims

In Column 34, Line 49, Claim 1, delete "such that".

In Column 34, Lines 59-66, Claim 1, delete "a Binary $\frac{\pi}{2}$ - BPSK Phase Shift Keying (BPSK) modulator, modulator" and insert --a Binary Phase Shift Keying (BPSK) modulator, a $\frac{\pi}{2}$ - BPSK modulator--.

In Column 36, Lines 4-10, Claim 11, delete "a $\frac{\pi}{2}$ - BPSK Binary Phase Shift Keying (BPSK) modulator, a modulator" and insert --a Binary Phase Shift Keying (BPSK) modulator, a $\frac{\pi}{2}$ - BPSK modulator--.

Signed and Sealed this
Eighth Day of September, 2020

Andrei Iancu
*Director of the United States Patent and Trademark Office*